(12) United States Patent
Asterjadhi et al.

(10) Patent No.: US 12,225,414 B2
(45) Date of Patent: *Feb. 11, 2025

(54) COORDINATED MEDIUM ACCESS

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Venkata Ramanan Venkatachalam Jayaraman, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,102

(22) Filed: Apr. 27, 2022

(65) Prior Publication Data

US 2022/0256404 A1 Aug. 11, 2022

Related U.S. Application Data

(63) Continuation of application No. 16/123,666, filed on Sep. 6, 2018, now Pat. No. 11,477,699.

(Continued)

(51) Int. Cl.
*H04W 28/26* (2009.01)
*H04W 72/044* (2023.01)
(Continued)

(52) U.S. Cl.
CPC ......... *H04W 28/26* (2013.01); *H04W 72/044* (2013.01); *H04W 72/23* (2023.01);
(Continued)

(58) Field of Classification Search
CPC ..... H04W 28/26; H04W 28/16; H04W 72/04; H04W 72/044; H04W 72/1289;
(Continued)

(56) References Cited

U.S. PATENT DOCUMENTS

| 8,472,463 B1 | 6/2013 | Ji et al. |
| 10,555,143 B2 | 2/2020 | Uchiyama |

(Continued)

FOREIGN PATENT DOCUMENTS

| CN | 104394552 A | 3/2005 |
| WO | WO-2015031487 | 3/2015 |

(Continued)

OTHER PUBLICATIONS

International Search Report and Written Opinion—PCT/US2018/050004—ISA/EPO—Dec. 3, 2018.

(Continued)

*Primary Examiner* — Sudesh M Patidar
(74) *Attorney, Agent, or Firm* — Holland & Hart LLP/Qualcomm Incorporated

(57) ABSTRACT

This disclosure provides systems, methods, apparatus, including computer programs encoded on computer storage media for one or more wireless devices to gain access to a wireless channel of a radio frequency spectrum band. In some aspects, a recurring coordinated medium interval is defined in the time domain and associated with the wireless channel. The coordinated medium interval includes a first time period, which may be referred to as a common reservation window, and a second time period, which may be referred to as a scheduled medium access window. During the first time period, access points (APs) attempting to gain access to the wireless channel may transmit reservation signals to reserve one or more scheduled service periods within the second time period of the same coordinated (Continued)

medium interval. The scheduled service periods reserved by an individual AP may be used for UL/DL communications between that AP and its associated stations (STAs).

34 Claims, 17 Drawing Sheets

Related U.S. Application Data

(60) Provisional application No. 62/556,925, filed on Sep. 11, 2017, provisional application No. 62/556,271, filed on Sep. 8, 2017.

(51) Int. Cl.
*H04W 72/23* (2023.01)
*H04W 74/02* (2009.01)
*H04W 74/04* (2009.01)
*H04W 74/08* (2009.01)
*H04W 84/12* (2009.01)
*H04W 88/08* (2009.01)

(52) U.S. Cl.
CPC ............ *H04W 74/02* (2013.01); *H04W 74/04* (2013.01); *H04W 74/0866* (2013.01); *H04W 84/12* (2013.01); *H04W 88/08* (2013.01)

(58) Field of Classification Search
CPC ......... H04W 72/0406; H04W 72/0446; H04W 72/23; H04W 74/02; H04W 74/0891; H04W 74/0866; H04W 74/0808; H04W 74/08; H04W 74/04; H04W 84/12
See application file for complete search history.

(56) References Cited

U.S. PATENT DOCUMENTS

| | | |
|---|---|---|
| 2003/0134642 A1 | 7/2003 | Kostic et al. |
| 2003/0161340 A1 | 8/2003 | Sherman |
| 2004/0013127 A1 | 1/2004 | Shvodian et al. |
| 2006/0153132 A1* | 7/2006 | Saito .................. H04W 74/06 370/329 |
| 2006/0198335 A1* | 9/2006 | Reunamaki ............ H04L 12/12 370/468 |
| 2008/0037496 A1* | 2/2008 | Smith .................. H04W 72/20 370/340 |
| 2008/0112357 A1 | 5/2008 | Gossain et al. |
| 2008/0177886 A1 | 7/2008 | Singh et al. |
| 2009/0131065 A1 | 5/2009 | Khandekar et al. |
| 2009/0168744 A1* | 7/2009 | Park .................. H04W 74/08 370/349 |
| 2009/0213786 A1 | 8/2009 | Tanno et al. |
| 2009/0252077 A1 | 10/2009 | Khandekar et al. |
| 2010/0103916 A1 | 4/2010 | Sugava |
| 2010/0226343 A1 | 9/2010 | Hsu et al. |
| 2010/0238878 A1 | 9/2010 | Jang |
| 2011/0222507 A1 | 9/2011 | Lee et al. |
| 2012/0182963 A1* | 7/2012 | Kneckt ............ H04W 72/0453 370/330 |
| 2012/0231828 A1 | 9/2012 | Wang et al. |
| 2013/0259018 A1* | 10/2013 | Ji .................. H04W 72/0446 370/338 |
| 2014/0023053 A1 | 1/2014 | Park et al. |
| 2015/0063327 A1 | 3/2015 | Barriac et al. |
| 2015/0304943 A1 | 10/2015 | Fong et al. |
| 2015/0382283 A1 | 12/2015 | Wang et al. |
| 2016/0029357 A1* | 1/2016 | Lv .................. H04L 47/125 370/235 |
| 2016/0081114 A1* | 3/2016 | Jung .................. H04W 72/04 370/329 |
| 2016/0105897 A1* | 4/2016 | Liu .................. H04W 72/54 370/235 |
| 2016/0219617 A1 | 7/2016 | Zhou et al. |
| 2016/0255507 A1* | 9/2016 | Cao .................. H04W 72/0446 370/329 |
| 2017/0048861 A1* | 2/2017 | Choi .................. H04L 5/0053 |
| 2017/0127419 A1* | 5/2017 | Seok .................. H04W 40/244 |
| 2018/0014297 A1* | 1/2018 | Kang .................. H04W 24/08 |
| 2018/0324607 A1 | 11/2018 | Rengarajan et al. |
| 2019/0082358 A1 | 3/2019 | Asterjadhi et al. |
| 2019/0150078 A1 | 5/2019 | Lee et al. |

FOREIGN PATENT DOCUMENTS

| | | |
|---|---|---|
| WO | WO-2016197825 A1 * | 12/2016 |
| WO | WO2019027493 A1 | 2/2019 |

OTHER PUBLICATIONS

Im S., et al., "MCCA: A High-Throughput MAC Strategy for Next-Generation WLANS", Medium Access Control Protocols for Wireless LANS, Publication Data: Technical report of Wireless Networking Group, Feb. 1, 2008 Coordinated Science Laboratory; Dept. Electrical and Computer Engineering; University of Illinois at Urbana—Champaign, US Source Info: vol. 15, Nr: 1, IEEE Wireless Communications, Feb. 2008, pp. 32-39, [The Right col. 3 of p. 34 to the Left col. 2 of p. 35], and Fig. 2.
Taiwan Search Report—TW107131498—TIPO—Oct. 22, 2021.
Taiwan Search Report—TW107131498—TIPO—Jan. 18, 2022.

* cited by examiner

COORDINATED MEDIUM ACCESS

CROSS-REFERENCE TO RELATED APPLICATIONS

The present Application for Patent is a Continuation of U.S. Patent application Ser. No. 16/123,666 by Asterjadhi et al., entitled "Coordinated Medium Access," filed Sep. 6, 2018, which claims the benefit of U.S. Provisional Patent Application No. 62/556,271 by Asterjadhi et al., entitled "Coordinated Medium Access," filed Sep. 8, 2017, and to U.S. Provisional Patent Application No. 62/556,925 by Asterjadhi, et al., entitled "Coordinated Medium Access," filed Sep. 11, 2017, each of which is assigned to the assignee hereof. The disclosure of the prior Applications are considered part of and are incorporated by reference in this Patent Application.

TECHNICAL FIELD

The following relates generally to wireless communication, and particularly to coordinated access to a wireless medium by one or more wireless devices.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (such as time, frequency, and power). A wireless network, for example a wireless local area network (WLAN), such as a Wi-Fi (i.e., Institute of Electrical and Electronics Engineers (IEEE) 802.11) network may include access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method can include identifying, by a first access point, a time interval associated with a wireless channel of a radio frequency spectrum band, the time interval including a coordinated reservation period for the wireless channel and a plurality of discrete service periods, transmitting a reservation signal over the wireless channel during the coordinated reservation period of the time interval, the reservation signal indicating one or more service periods reserved by the first access point from the plurality of service periods of the time interval, and sending or receiving one or more transmissions during the one or more service periods reserved by the first access point.

In some implementations, the method can include receiving a plurality of parameters associated with an access scheme for reserving the wireless channel. In some implementations, the method can include transmitting the reservation signal based at least in part on one or more of the received parameters.

In some implementations, the method can include receiving the plurality of parameters from a central controller. In some implementations, the method can include receiving the plurality of parameters from a distributed access point.

In some implementations, the plurality of parameters can include at least one of: a start time of the coordinated reservation period, a duration of the coordinated reservation period, a duration of the plurality of discrete service periods, an access order, and a plurality of reservation policies.

In some implementations, the method can include identifying a basic service set (BSS) associated with a plurality of access points. In some implementations, the method can include identifying a plurality of parameters associated with the BSS. In some implementations, the plurality of parameters includes at least one of a start time of the coordinated reservation period, a duration of the coordinated reservation period, a duration of the plurality of discrete service periods, a plurality of access policies, and a plurality of reservation policies. In some implementations, the start time of the coordinated reservation period may be synchronized for the plurality of access points. In some implementations, the method can include transmitting the reservation signal based at least in part on one or more of the identified parameters.

In some implementations, the reservation signal may be at least one of a management frame, a control frame, a Null Data Packet (NDP) frame, or a beacon or a new reservation frame.

In some implementations, the method can include receiving an initial signal indicating one or more service periods reserved by a second access point. In some implementations, the method can include determining, based on receiving the initial signal, a subset of service periods of the time interval that are available for reservation. In some implementations, the one or more service periods reserved by the first access point may be based on determining the subset of service periods.

In some implementations, the initial signal may be a clear signal received from a station associated with the second access point. In some implementations, the initial signal may be a reservation signal received from the second access point.

In some implementations, the method can include scheduling a downlink transmission to a station or an uplink transmission from the station during the one or more service periods reserved by the first access point.

Another innovative aspect of the subject matter described in this disclosure can be implemented in an apparatus for wireless communication. The apparatus can include means for identifying, by a first access point, a time interval associated with a wireless channel of a radio frequency spectrum band, the time interval including a coordinated reservation period for the wireless channel and a plurality of discrete service periods, means for transmitting a reservation signal over the wireless channel during the coordinated reservation period of the time interval, the reservation signal indicating one or more service periods reserved by the first access point from the plurality of service periods of the time interval, and means for sending or receiving one or more transmissions during the one or more service periods reserved by the first access point.

Another innovative aspect of the subject matter described in this disclosure can be implemented in an apparatus for wireless communication. The apparatus can include a processor, memory in electronic communication with the processor, and instructions stored in the memory. The instructions can be operable to cause the processor to identify, by a first access point, a time interval associated with a wireless channel of a radio frequency spectrum band, the time interval including a coordinated reservation period for the wireless channel and a plurality of discrete service periods, transmit a reservation signal over the wireless channel during the coordinated reservation period of the time interval, the reservation signal indicating one or more service periods reserved by the first access point from the plurality of service periods of the time interval, and send or receive one or more transmissions during the one or more service periods reserved by the first access point.

Another innovative aspect of the subject matter described in this disclosure can be implemented in a non-transitory computer readable medium for wireless communication. The non-transitory computer-readable medium can include instructions operable to cause a processor to identify, by a first access point, a time interval associated with a wireless channel of a radio frequency spectrum band, the time interval including a coordinated reservation period for the wireless channel and a plurality of discrete service periods, transmit a reservation signal over the wireless channel during the coordinated reservation period of the time interval, the reservation signal indicating one or more service periods reserved by the first access point from the plurality of service periods of the time interval, and send or receive one or more transmissions during the one or more service periods reserved by the first access point.

Another innovative aspect of the subject matter described in this disclosure can be implemented in a method for wireless communication. The method can include identifying, by a station, a time interval associated with a wireless channel of a radio frequency spectrum band, the time interval including a coordinated reservation period for the wireless channel and a plurality of discrete service periods, waking up a receiver of the station during the coordinated reservation period of the time interval to receive a reservation signal from an access point associated with the station, the reservation signal indicating a service period reserved by the access point from the plurality of service periods of the time interval, waking up the receiver of the station during the service period reserved by the access point, and sending or receiving one or more transmissions during the service period reserved by the access point.

In some implementations, the method can include transmitting a clear signal over the wireless channel during the coordinated reservation period of the time interval based at least in part on the reservation signal from the access point.

In some implementations, the method can include receiving, from the access point, a beacon signal indicating a mapping of uplink or downlink transmissions for the service period reserved by the access point. In some implementations, waking up the receiver of the station during the service period may be based on receiving the beacon signal.

Another innovative aspect of the subject matter described in this disclosure can be implemented in an apparatus for wireless communication. The apparatus can include means for identifying, by a station, a time interval associated with a wireless channel of a radio frequency spectrum band, the time interval including a coordinated reservation period for the wireless channel and a plurality of discrete service periods, means for waking up a receiver of the station during the coordinated reservation period of the time interval to receive a reservation signal from an access point associated with the station, the reservation signal indicating a service period reserved by the access point from the plurality of service periods of the time interval, means for waking up the receiver of the station during the service period reserved by the access point, and means for sending or receiving one or more transmissions during the service period reserved by the access point.

Another innovative aspect of the subject matter described in this disclosure can be implemented in an apparatus for wireless communication. The apparatus can include a processor, memory in electronic communication with the processor, and instructions stored in the memory. The instructions may be operable to cause the processor to identify a time interval associated with a wireless channel of a radio frequency spectrum band, the time interval including a coordinated reservation period for the wireless channel and a plurality of discrete service periods, wake up a receiver of the station during the coordinated reservation period of the time interval to receive a reservation signal from an access point associated with the station, the reservation signal indicating a service period reserved by the access point from the plurality of service periods of the time interval, wake up the receiver of the station during the service period reserved by the access point, and send or receive one or more transmissions during the service period reserved by the access point.

Another innovative aspect of the subject matter described in this disclosure can be implemented in a non-transitory computer readable medium for wireless communication. The non-transitory computer-readable medium can include instructions operable to cause a processor to identify a time interval associated with a wireless channel of a radio frequency spectrum band, the time interval including a coordinated reservation period for the wireless channel and a plurality of discrete service periods, wake up a receiver of the station during the coordinated reservation period of the time interval to receive a reservation signal from an access point associated with the station, the reservation signal indicating a service period reserved by the access point from the plurality of service periods of the time interval, wake up the receiver of the station during the service period reserved by the access point, and send or receive one or more transmissions during the service period reserved by the access point.

Details of one or more implementations of the subject matter described in this disclosure are set forth in the accompanying drawings and the description below. Other features, aspects, and advantages will become apparent from the description, the drawings and the claims. Note that the relative dimensions of the following Figures may not be drawn to scale.

BRIEF DESCRIPTION OF THE DRAWINGS

Like reference numbers and designations in the various drawings indicate like elements.

DETAILED DESCRIPTION

Figure 1:
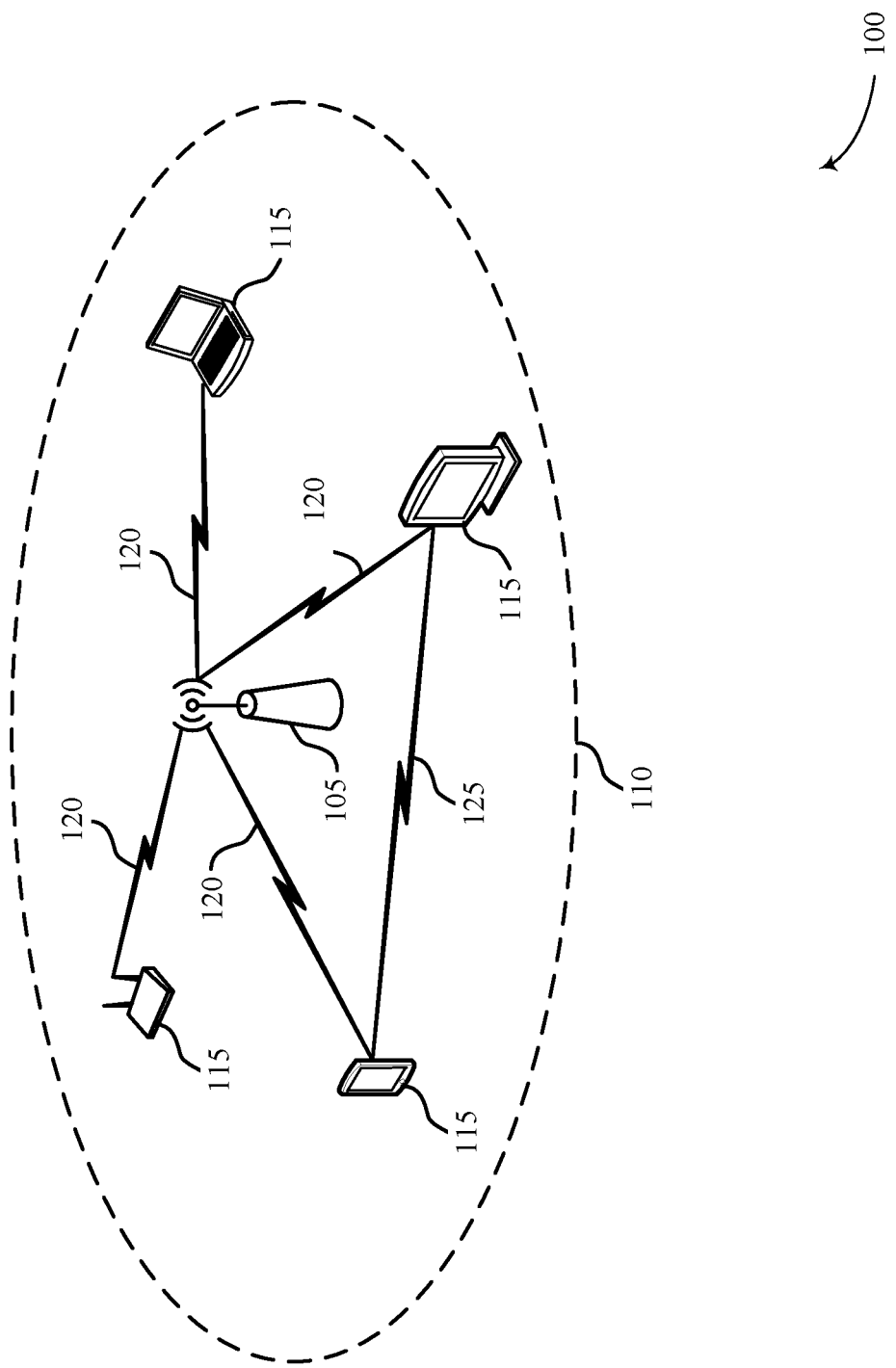
FIG. 1 shows an example of a system for wireless communication that supports coordinated medium access in accordance with aspects of the present disclosure.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Techniques are disclosed for one or more wireless devices to gain access to a wireless channel of a radio frequency spectrum band. According to these techniques, a recurring coordinated medium interval is defined in the time domain and associated with the wireless channel. The coordinated medium interval includes a first time period, which may be referred to as a common reservation window, and a second time period, which may be referred to as a scheduled medium access window. During the first time period, wireless access points (APs) attempting to gain access to the wireless channel may transmit reservation signals to reserve one or more scheduled service periods within the second time period of the same coordinated medium interval.

AP access to the wireless channel during the first time period may be implemented using either a pre-deterministic access mode or a contention-based mode. According to the pre-deterministic access mode, each AP may be assigned a position within a defined order and have an opportunity to transmit a reservation signal relative to other APs based on the defined order. This defined order may rotate periodically (for example, once every coordinated medium interval). According to the contention-based mode, each AP may perform energy detection or other channel sensing on the wireless channel during the first time period and transmit a reservation signal to reserve scheduled service periods of the second time period when the channel sensing during the first time period indicates that the wireless channel is available. The pre-deterministic access mode may be used for managed networks and the second mode may be used for unmanaged networks.

When the pre-deterministic access mode is implemented in a managed network, a central controller may determine or select a set of access parameters related to the first time period and distribute these parameters to the APs of the network. These parameters may include one or more of: a start time of the first time period, a start time of the second time period, a duration of the first time period, a duration of the second time period, a total number of scheduled service periods in the second time period, a defined order in which APs can access the wireless channel during the first time period to reserve scheduled service periods, and a reservation policy. In some implementations, the central controller may set up the managed network and distribute these parameters to APs belonging to the managed network.

Following successful transmission of a reservation signal during the first time period that indicates one or more scheduled service periods of the second time period, the access point may use the one or more scheduled service periods for uplink and downlink traffic between the access point and its associated wireless stations (STAs).

In some implementations, multiple APs may not be in the range of each other. In that case, to extend the reachability of a reservation signal, during a coordinated medium interval, the AP may assign one or more of its associated STAs to echo reservation signals transmitted by the AP. Each echoed reservation signal may be referred to as a clear signal. The clear signal may be a repetition of the reservation signal transmitted by the AP during the first time period. The AP may select a subset of STAs to perform this echoing during the first time period while allowing other associated STAs to remain in a sleep mode during the first time period.

Particular implementations of the subject matter described in this disclosure can be implemented to realize one or more of the following potential advantages. Specifically, the proposed techniques allow for coordinated access to a wireless channel while reducing the signaling overhead associated with traditional methods of contention-based access. In some implementations, the proposed techniques may be used to access wireless channels in a 6 GHz band. Legacy STAs may not operate in the 6 GHz band, and traditional contention-based access techniques for accessing wireless channels may not be applicable in this band. More efficient access schemes, such as the ones proposed in this disclosure, may be implemented to improve medium utilization using coordinated or scheduled wireless channel access.

FIG. 1 illustrates a wireless local area network (WLAN) 100 (also known as a Wi-Fi network). The WLAN 100 may include an AP 105 and multiple associated STAs 115, which may represent devices such as mobile stations, personal digital assistant, other handheld devices, netbooks, notebook computers, tablet computers, laptops, display devices (such as TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some implementations, the coverage area 110 of an AP 105 may be divided into sectors (also not shown). The WLAN 100 may include APs 105 of different types (such as metropolitan area, home network, etc.), with varying and overlapping coverage areas 110. Two STAs 115 also may communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. The STAs 115 and the APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11-extreme high throughput (EHT), etc. In some other implementations, peer-to-peer connections or ad hoc networks may be implemented within the WLAN 100.

The AP 105 of the WLAN 100 may use an unlicensed or shared wireless channel of a radio frequency spectrum band to communicate with the STAs 115. The AP 105 may contend for access to the wireless channel along with other APs associated with different BSSs or different WLANs. A recurring coordinated medium interval (CMI) may be defined in the time domain and associated with the wireless channel. The coordinated medium interval may include a first time period, which may be referred to as a common reservation window (CRW), and a second time period, which may be referred to as a scheduled medium access (SMA) window. The AP 105 may transmit a reservation signal during the first time period to reserve one or more scheduled service periods (SSPs) within the second time period of the same coordinated medium interval. The AP may use the scheduled service period(s) indicated in its reservation signal for uplink and downlink communications between the AP 105 and its associated STAs. In some implementations, the AP may use the scheduled service periods for scheduling peer-to-peer communications.

Figure 2:
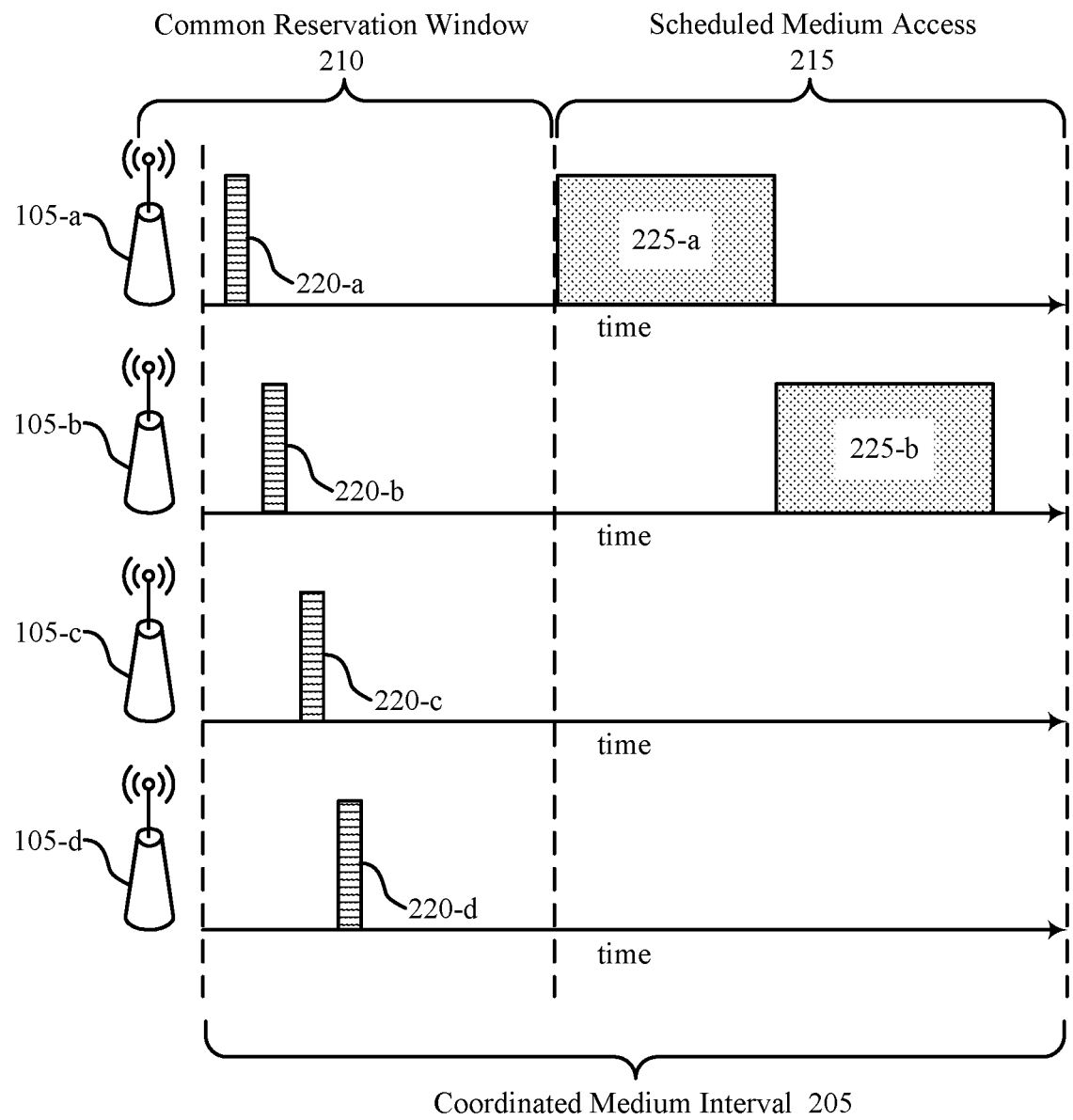
FIGS. 2-6 show examples of transmission schemes for coordinated medium access by wireless access points.

FIG. 2 shows an example of a transmission scheme 200 for coordinated medium access by wireless access points. In some implementations, the transmission scheme 200 may implement aspects of WLAN 100. For example, the AP 105-a, AP 105-b, AP 105-c, and AP 105-d may be examples of an AP 105 as described with reference to FIG. 1.

The transmission scheme 200 may be a transmission scheme for transmissions occurring within a coordinated medium interval period 205.

According to one or more aspects of the present disclosure, the coordinated medium interval 205 may include a first time period and second time period. In some implementations, the first time period may be referred to as a common reservation window 210 and the second time period may be referred to as a scheduled medium access 215 respectively. The common reservation window 210 may provide an opportunity for a number of APs 105 to contend for the scheduled service periods 225 during the subsequent scheduled medium access 215. In some implementations, the APs 105 (such as APs 105-a, 105-b, 105-c, 105-d) may be awake, listening, and contending for the scheduled service periods 225 during the common reservation window 210. In some implementations, the APs 105 may determine which scheduled service periods 225 are reserved for themselves and their neighbors during the common reservation window 210. For example, the AP 105-b may transmit the reservation signal 220-b thus reserving an scheduled service period 225-b for transmissions during the scheduled medium access 215. Additionally, the AP 105-b may determine which scheduled service periods 225 are available by listening during the common reservation window 210. For example, the AP 105-b may receive the reservation signal 220-a transmission from the AP 105-a and determine that the scheduled service period 225-a may be reserved for the AP 105-a (such as the scheduled service period 225-a may not be available for the AP 105-b to reserve). Further, the common reservation window 210 may be reserved for downlink/uplink exchange between the APs 105 and their associated STAs. That is, there may not be STA contention during the common reservation window 210.

An AP 105 may transmit a reservation signal 220 during the common reservation window 210 in order to reserve an scheduled service period 225 during the scheduled medium access 215. The reservation signals 220 may act to reserve an scheduled service period 225 either within the coordinated medium interval 205 or across multiple coordinated medium intervals 205. That is, a reserved scheduled service period 225 may be aperiodic (such as a single reservation signal 220 acts to reserve one or more scheduled service periods 225 within the coordinated medium interval 205), semipersistent, or periodic (such as a single reservation signal 220 acts to reserve the scheduled service periods 225 periodically across more than one coordinated medium interval 205). The number of scheduled service periods 225 that an AP 105 may reserve may be dictated by a reservation policy. According to one reservation policy, the APs 105 may send one reservation signal 220 in order to reserve one scheduled service period 225. In this reservation policy, there may be multiple pre-defined rounds enabled in the same common reservation window 210 for the APs 105 to reserve more than one scheduled service period 225. In some implementations, the time period within or across the coordinated medium intervals 205 may be represented using a bitmap. In this implementation, each bit of the bitmap may correspond to a time segment of the scheduled medium access 215. For example, a bit may correspond to x ms of scheduled medium access 215 (such as if x equals four, then the bit may correspond to the fourth millisecond of the scheduled medium access 215).

The APs 105 may contend during the common reservation window 210 for the scheduled service periods 225 during the scheduled medium access 215 using pre-deterministic access. In a pre-deterministic access system, the APs 105 may transmit some reservation signals 220 according to a known order. For example, the APs 105 may transmit the reservation signals 220 in a round robin order. That is, the AP 105-a may transmit the reservation signal 220-a followed by the AP 105-b transmitting the reservation signal 220-b, then the AP 105-c may transmit the reservation signal 220-c, and finally the AP 105-d may transmit the reservation signal 220-d. The order may rotate every coordinated medium interval 205. That is, the first AP 105 to transmit the reservation signal 22 within the common reservation window 210 may change from one coordinated medium interval 205 to the next coordinated medium access (not shown). The APs 105 using pre-deterministic access may be aware of the presence of other APs 105 within the system (such as APs within the system that have undergone a discovery phase). In some implementations, pre-deterministic access may occur within a managed network. That is, the network may have a centralized controller (such as one of the APs 105 or a separate, third party device). In this implementation, the centralized controller may determine the basic pre-deterministic access parameters (such as common reservation window start time, common reservation window duration, scheduled medium access duration, access order, reservation policies).

In the pre-deterministic access system, the centralized controller may assign APs 105 in a basic service set (BSS) set that will share common pre-deterministic access-based parameters. In some implementations, the parameters for a BSS set may change during certain epochs (such as a lifetime may be associated with a BSS set). In the event that the pre-deterministic access-based parameters change, the APs 105 may have sufficient time to propagate these updates to their associated STAs prior to implementing the updated parameters. The centralized controller may be responsible for optimizing allocations for the APs 105 in a BSS set based on the APs' 105 location and other relevant information. The centralized controller may enable reuse while minimizing interference between adjacent BSS sets. In some implementations, the pre-deterministic access system may promote fairness amongst APs 105. For example, the central control may fairly assign common reservation window 210 access for the APs 105, and may indicate a maximum number of scheduled service periods 225 that each AP 105 may reserve per access. The pre-deterministic access system may use synchronization within a BSS set, which may include an alignment of common reservation windows 210. In some implementations, one or more APs 105 may be added to a pre-deterministic access list (such as a BSS set) by the centralized controller. For example, the AP 105-b may be joining a centralized network including the APs 105-a, 105-c, and 105-d. In this example, a centralized controller may update an order for reservation signal 220 transmissions within the common reservation window 210 to account for the new AP 105-b. The centralized controller may further update a duration for reservation signal 220 transmissions or the scheduled service period 225 transmissions.

Additionally, or alternatively, the APs 105 may contend for the scheduled service periods 225 using the reservation signals 220 through contention-based access. The APs 105 using contention-based access for transmitting the reservation signals 220 during the common reservation window 210 may contend to access a medium for transmitting the reservation signals 220 (such as the APs 105 may use carrier-sense multiple access with collision avoidance in order to transmit a reservation signal 220). Contention-based access may be used in networks that are unmanaged. In this example, APs 105 may use distributed access. When using contention-based access for the reservation signal 220 transmissions, the APs 105 may not be aware of the presence of other APs. For example, the AP 105-d may be aware of the AP 105-c. However, in this example, the AP 105-d may not be aware of the presence of AP 105-a or AP 105-b. The APs 105 using contention-based access for transmitting the reservation signals 220 may leverage network neighbor awareness networking (NAN) concepts. These concepts may allow APs 105 using contention-based access to achieve some level of synchronization, merge clusters of APs 105, determine common reservation window 210 durations, or combinations thereof. An AP 105 that newly joins, may begin contending for access to the medium in order to transmit a reservation signal 220. For example, the AP 105-c may be joining an unmanaged network including the APs 105-a, 105-b, and 105-d. In this example, the AP 105-c may begin contending for access to the medium in order to transmit a reservation signal 220-c within the common reservation window 210. With the addition of the AP 105-c, the collision domain may expand naturally (such as in reaction to the AP 105-c joining). In some implementations, a system may utilize a hybrid access mode. For example, a system may use pre-deterministic access for established BSSs and contention-based access for nascent BSSs associated with an AP 105.

The APs 105 may transmit a frame (such as a short frame like a null data packet (NDP) frame, a control frame, a management frame) or a beacon (such as a short beacon or a beacon with limited elements) as reservation signal 220. In some implementations, the APs 105 may transmit a reservation signal 220 utilizing a single type of transmission. For example, APs 105-a, 105-b, 105-c, and 105-d may transmit the reservation signal 220-a as well as future reservation signal transmissions using NDP frames. In another example, each of the APs 105 may transmit reservation signals 220 using a beacon. Additionally, or alternatively, the APs 105 may transmit the reservation signals 220 using dynamic signaling. In this implementation, the APs 105 may transmit the reservation signals 220 using different signals based on the environment. For example, the AP 105-c may be in a neighborhood with very few other APs 105 and may determine to transmit the reservation signal 220-c using a beacon. Alternatively, AP 105-d may be in a neighborhood with many APs 105 and may determine to transmit the reservation signal 220-d using an NDP frame.

The scheduled medium access 215 may provide an interval for uplink (UL) and downlink (DL) communications between APs 105 and STAs that may be within a coverage area associated with the APs 105 and may be served by the APs 105. The scheduled medium access 215 may provide an interval for uplink and downlink communications between APs 105 and STAs that are being served by APs 105. UL and DL exchanges may be localized in scheduled service periods 225 that occur during the scheduled medium access 215 of the coordinated medium interval 205. STAs may determine a serving AP's scheduled service period 225 by reading its reservation signal 220. For example, a STA being served by the AP 105-b may analyze the reservation signal 220-b in order to determine that the scheduled service period 225-b may be reserved for UL and DL transmissions with the AP 105-b. In some implementations, a STA may not perform UL transmissions to its serving AP 105 outside of an scheduled service period 225 reserved by the serving AP 105. In some implementations, STAs may not be allowed to access the medium unless enabled by their AP 105 (such as in certain scheduled service periods 225). STAs may therefore selectively wake up during the scheduled service periods 225 corresponding to their serving AP 105. Additionally, or alternatively, the STAs may wake up for those scheduled service periods 225 that may be of interest for the STA. In such implementations, an AP 105 may transmit a beacon at the beginning of its scheduled service period 225. The beacon may provide a detailed mapping of UL and DL resources (such as for the scheduled service period 225). STAs being served by the AP 105 may determine to wake up or stay asleep for an scheduled service period 225 based on the mapping received in the beacon. In some implementations, a target beacon transmission time (TBTT) may be fixed or slowly changing (such as periodic, or semipersistent). STAs may negotiate wake TBTTs for certain beacons, which may coincide with periodic or semipersistent scheduled service periods 225.

Figure 3:
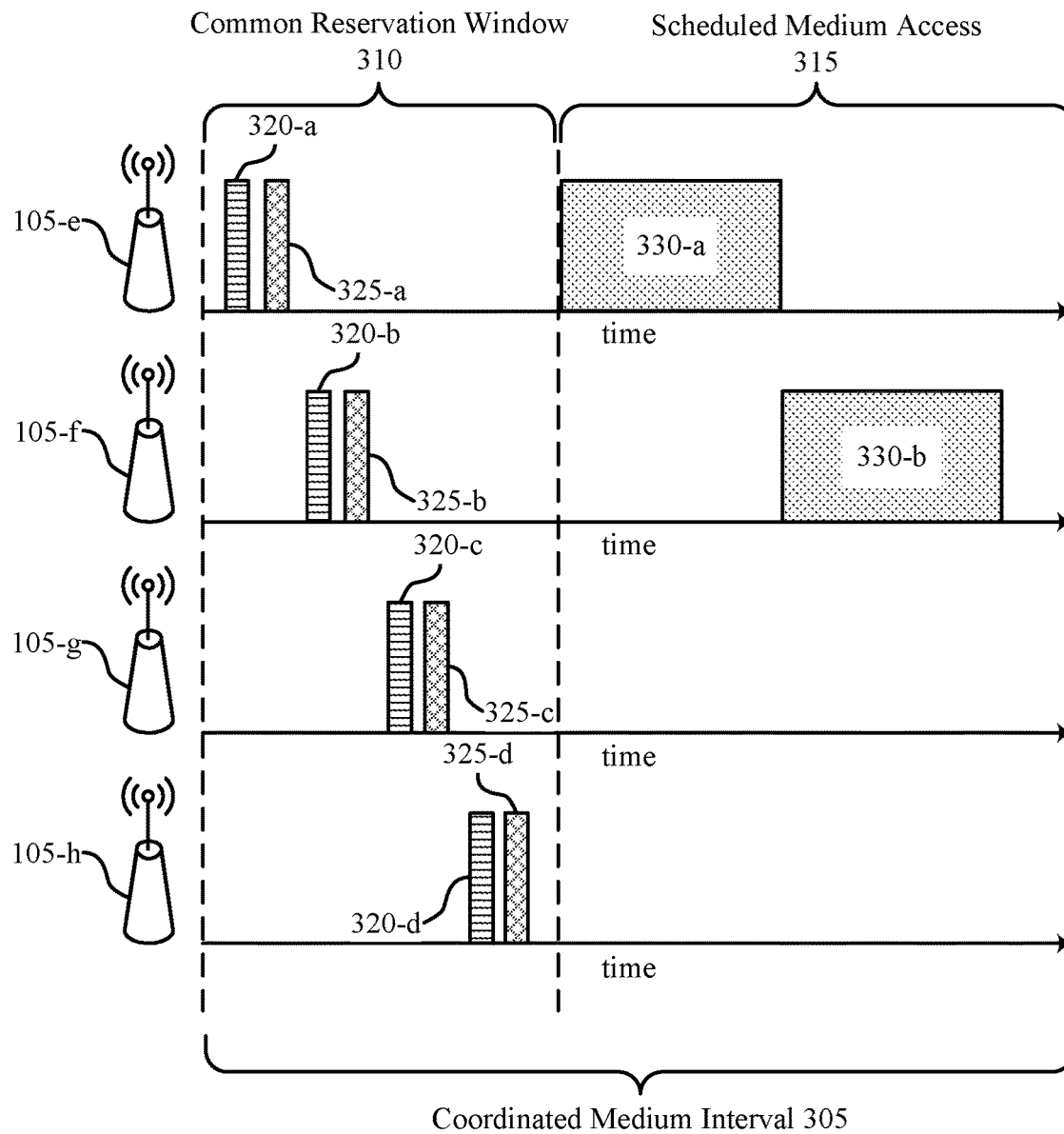

FIG. 3 shows an example of a transmission scheme 300 for coordinated medium access by wireless access points. In some implementations, the transmission scheme 300 may implement aspects of WLAN 100 and transmission scheme 200. For example, the transmission scheme 300 may be used by an AP 105. In some implementations, transmission scheme 300 may be an instance of the transmission scheme 200. For example, common reservation windows 310, scheduled medium accesses 315, reservation signals 320, and scheduled service periods 330 may be examples of common reservation windows 210, scheduled medium accesses 215, reservation signals 220, and scheduled service periods 225 respectively as discussed with reference to FIG. 2.

The coordinated medium interval 305 may include a first and second time period, or a common reservation window 310 and a scheduled medium access 315 respectively. The common reservation window 310 may provide an opportunity for some APs 105 to contend for scheduled service periods 330 during the subsequent scheduled medium access 315. In some implementations, APs 105 may determine the scheduled service periods 330 that are reserved for themselves and their neighbors during the common reservation window 310. For example, the AP 105-e may transmit a reservation signal 320-a to reserve the scheduled service period 330-a for transmissions during the scheduled medium access 315. Additionally, the APs 105 may determine which or the scheduled service periods 230 may be reserved for other APs 105 by listening during the common reservation window 310. For example, the AP 105-f may receive the reservation signal 320-a transmission from the AP 105-e and determine that scheduled service period 330-a may be reserved for AP 105-e. Based on this determination, the AP 105-f may transmit the reservation signal 320-b to reserve a different scheduled service period 330 (such as scheduled service period 330-b). The reservation signals 320 may be received by APs 105 or STAs within a predefined range (such as a predefined distance) of the transmitting APs 105. In some implementations, the APs 105 within a system may not be within range of other APs within the system. For example, AP 105-e may not be within range of AP 105-h. In this example, AP 105-h may be referred to as a hidden node with reference to AP 105-e.

In some systems with a hidden node (such as a system using contention-based access where some APs 105 may be out of range), reservation signals 320 may collide. That is, multiple APs 105 may transmit reservation signals 320 such that the reservation signals 320 may overlap, causing a corrupted reservation signal 320. For example, the APs 105-e and 105-h may not be able to receive transmissions from each other (such as they may be out of range). In this example, the APs 105-e and 105-h may not be aware when the other transmits the reservation signal 320. Therefore, AP 105-e may transmit its reservation signal 320-a while AP 105-h may be transmitting its own reservation signal 320-d. The corrupted reservation signal 320 that may result from an overlapping transmission may cause uncertainty as to which of the scheduled service periods 330 may be reserved by which AP 105. In some other implementations, a corrupted reservation signal 320 may cause uncertainty as to which STAs are aware of the scheduled service periods 330.

Some systems with hidden nodes may further experience collisions during the scheduled medium access 315 time interval. For example, some reservation signals 220 may not be received by each AP 105 resulting collisions of some scheduled service periods 330. That is, some overlapping basic service set (OBSS) STAs may not be in range of each of the APs 105 and may not receive some reservation signals 320 and may therefore be unaware of certain reserved scheduled service periods 330. This may lead to a collision during the reserved scheduled service periods 330. For example, the AP 105-f may transmit the reservation signal 320-b to reserve the scheduled service period 330-b. However, the AP 105-e may be out of range and may not receive the reservation signal 320-b. Therefore, the AP 105-e may be unaware that the AP 105-f may have reserved the scheduled service period 330-b. In this example, a collision may occur if the AP 105-f transmits a DL transmission to its STAs within its own coverage area during the scheduled service period 330-b while the OBSS STAs within the coverage area of AP 105-e transmit UL transmissions to their serving AP 105-e. Here, there may be STAs within both the coverage areas of APs 105-e and 105-f that are being served by different APs 105 which may result in a collision.

APs 105 may transmit request to send (RTS) and clear to send (CTS) transmissions at the start of each scheduled service period 330 in order to mitigate collisions resulting from hidden nodes. STAs being served by the APs 105 may wake up to receive the RTS and CTS transmissions at the beginning of the scheduled service period 330. In some implementations, STAs may wake up for scheduled service periods 330 that may not be available for their serving AP 105. Additionally, or alternatively, a subset of STAs may be enabled to transmit clear signals (CSs) 325. The subset of STAs may correspond to a group of STAs elected by an AP 105 to respond to the reservation signal 320 with a clear signal 325. The clear signal 325 may act as an amplification and forward of the reservation signal 320. For example, AP 105-h may transmit reservation signal 320-d and a STA elected by AP 105-h may transmit clear signal 325-d which may echo the contents of reservation signal 320-d. This may extend reachability of the reservation signal 320-d generated by the AP 105-h. Each AP 105 may designate, during the coordinated medium interval 305 that precedes the common reservation window 310, a subset of STAs (or other APs 105) to send a clear signal 325. By designating a subset of STAs (rather than all of the STAs being served by the AP 105) to send clear signals 325, the APs 105 may decrease traffic on the medium (such as avoid over suppressing the medium) or allow non-relevant STAs to remain asleep during certain scheduled service periods 330. In some implementations, the designation may be based on which STAs may be prone to collisions with OBSSs. That is, an AP 105 may signal to STAs for which additional DL bufferable unit delivery is pending or expected, and which may collide. In some implementations, APs 105 may designate a subset of STAs to send clear signals 325 if the STAs are to participate in coordinated multipoint (CoMP) transmissions with that AP 105.

Figure 4:
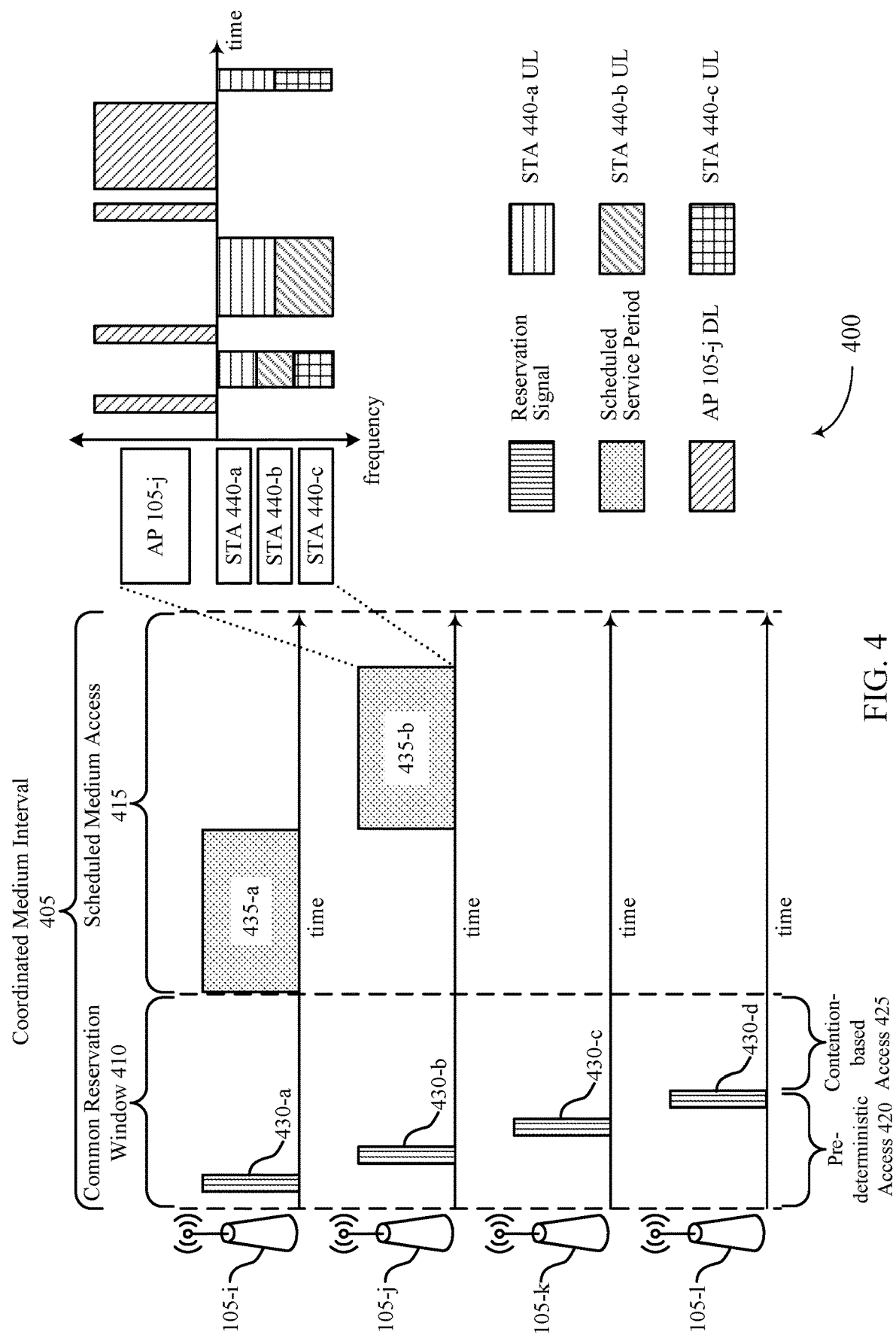

FIG. 4 shows an example of a transmission scheme 400 for coordinated medium access by wireless access points. In some implementations, the transmission scheme 400 may implement aspects of WLAN 100 and transmission schemes 200 and 300. For example, the transmission scheme 400 may be used by an AP 105 as discussed with reference to FIGS. 1, 2, and 3. In some implementations, the transmission scheme 400 may be an instance of transmission schemes 200 or 300. For example, coordinated medium interval 405 may be an example of coordinated medium intervals 205 or 305 and the scheduled service periods 435 may be examples of scheduled service periods 225 or 330.

The coordinated medium interval 405 may include a first time period and second time period, or a common reservation window 410 and a scheduled medium access 415 respectively. The common reservation window 410 may provide an opportunity for some APs 105 to contend for scheduled service periods 435 during the subsequent scheduled medium access 415. In some implementations, the APs 105 may determine scheduled service periods 435 that are reserved for themselves and their neighbors during the common reservation window 410 based on sending and receiving the reservation signal 430. For example, an AP 105-*i* may transmit the reservation signal 430-*a* thus reserving the scheduled service period 435-*a* for transmissions during the scheduled medium access 415. In this example, neighboring APs 105 (such as the APs 105-*j*, 105-*k*, and 105-*l*) may determine that scheduled service period 435-*a* may be reserved and subsequently select other scheduled service periods 435 from the remaining ones and send their own reservation signals 430.

An AP 105 may transmit the reservation signal 430 during the common reservation window 410 in order to reserve an scheduled service period 435 during the scheduled medium access 415. The reservation signal 430 may be semipersistent or periodic and may reserve one or more scheduled service periods 435 over one or more coordinated medium intervals 405. In some implementations, the APs 105 may use pre-deterministic access 420 or contention-based access 425 in order to transmit reservation signals 430 during common reservation window 410 for reserving scheduled service periods 435. Here, there may be a first period within the common reservation window 410 allocated for pre-deterministic access 420 followed by a second period allocated for contention-based access 425. In this implementation, the APs 105 may transmit reservation signals 430 according to a pre-defined order during the period allocated for pre-deterministic access 420. The APs 105 may enter a period for contention-based access 425. In some implementations, the APs 105 associated with established BSSs (such as an AP 105 previously included in the pre-defined order) may use the pre-deterministic access 420 while APs 105 associated with a newly established BSS (such as an AP 105 not previously included in the pre-defined order due to, for example, being recently established) may use the contention-based access 425.

The APs 105 may use the scheduled service periods 435 following the transmissions of the reservation signals 430 for reporting network related updates to its STAs. In some implementations, the network related updates may be expected to be short. The APs 105 may transmit its beacons at the start of each scheduled service period 435 to report a transmission schedule for the remaining scheduled service period 435. For example, the beacon may report network updates or DL traffic delivery to served STAs 440. A STA being served by an AP 105 may wake up during a reserved scheduled service period 435 for exchanging frames with the AP 105. In some implementations, the STA 440 may go to sleep outside of scheduled service periods that may not be reserved by its serving AP 105. Additionally, or alternatively, the STA 440 may go to sleep for scheduled service periods 435 that may be reserved by its serving AP 105 but may not contain any traffic relevant to the STA 440. A STA 440 may determine whether to go to sleep based on receiving the reservation signal 430 or beacon from its serving AP 105 (such as a beacon sent in a semipersistent scheduled service period 435).

For example, the AP 105-*j* may be serving several STAs 440-*a*, 440-*b*, and 440-*c*. The STAs 440 may receive the reservation signal 430-*b* indicating that the AP 105-*j* may have reserved the scheduled service period 435-*b* during the subsequent scheduled medium access 415. In some other implementations, AP 105-*j* may have transmitted the reservation signal 430 during a previous common reservation window 410 indicating a periodic or semipersistent scheduled service period 435 reservation. In this implementation, the STAs 440-*a*, 440-*b*, and 440-*c* may determine that the AP 105-*j* may have reserved the scheduled service period 435-*b* based on receiving the reservation signal 435 prior to the current coordinated medium interval 405. The STAs 440 may wake up during the time period allocated to the scheduled service period 435-*b* based on determining the scheduled service period 435-*b* may be reserved by their serving AP 105-*j*. At the start of the scheduled service period 435-*b*, the AP 105-*j* may transmit a first DL signal which may be a beacon indicating transmissions for the remainder of the scheduled service period 435-*b*. The STAs 440 may determine to stay awake or go to sleep based on the indicated transmissions. That is, a STA 440 may determine to go to sleep for the remainder of the scheduled service period interval 435-*b* if the beacon indicates that there are no relevant transmissions for the STA 440 in the scheduled service period interval 435-*b*. A serving AP 105 may exchange keep-alive frames with its STAs 440 during an scheduled service period 435. The keep-alive frames may provide schedule updates for the scheduled service periods 435 (such as update the STA if any change in schedule occurs). In the remaining scheduled service period 435-*b*, the AP 105-*j* and its served STAs 440-*a*, 440-*b*, and 440-*c* may exchange relevant UL and DL communications.

The APs 105 may use reserved scheduled service periods 435 during the scheduled medium access 415. An AP 105 that reserves an scheduled service period 435 may be the owner of the scheduled service period 435. As the owner of an scheduled service period 435, an AP 105 may be responsible for collecting feedback from its STAs 440. In some implementations, the AP 105 may choose to share resources with other APs 105 (such as through CoMP transmissions). In this implementation, an owner AP 105 may indicate an intention to share resources with other APs 105 in preceding scheduled medium accesses 415. The AP 105 may be responsible for allocating UL and DL resources to its STAs 440 during the scheduled service period 435. For example, if a STA 440 requests a number of resources that may exceed the current resources available, than the serving AP 105 may be responsible for scheduling the STA 440 in subsequent scheduled medium accesses 415. In some implementations, the owner AP 105 may lease unused resources within the scheduled service period 435 to other APs 105 that may not have sufficient allocated scheduled service periods 435 (such as other APs 105 may be able to use more scheduled service periods 435 than they reserved, other APs 105 may not have been able to reserve any scheduled service periods 435, etc.). The owner AP 105 may reserve too many scheduled service periods 435 (such as over-reserve) as the owner AP 105 may not know its STAs 440 status. Additionally, or alternatively, the owner AP 105 may allocate all of the resources within its scheduled service period 435, thus reaching full capacity for the scheduled medium access 415, and may not lease resources to other APs 105.

Figure 5:
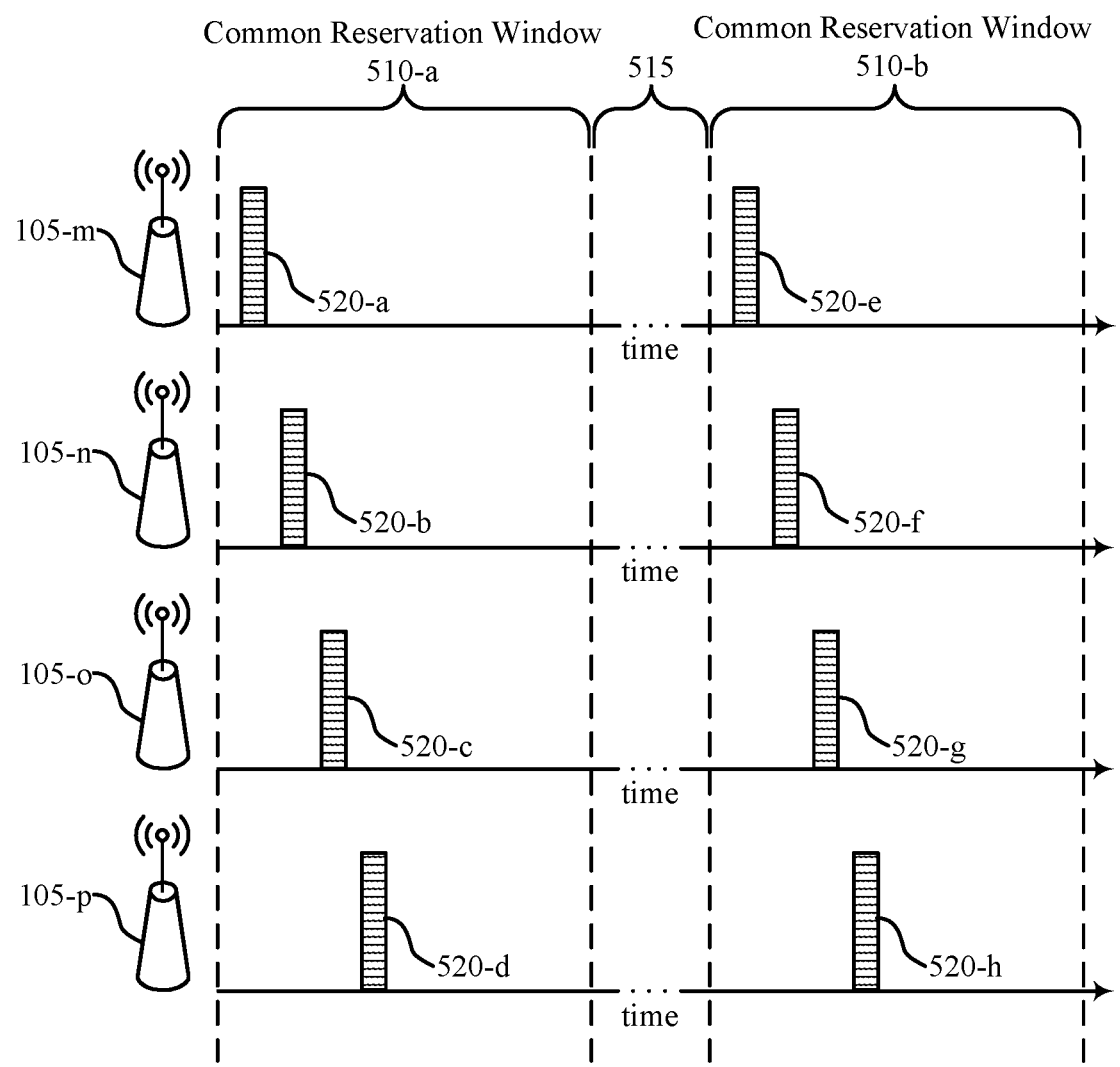

FIG. 5 shows an example of a transmission scheme 500 for coordinated medium access by wireless access points. The transmission scheme 500 may show a transmission scheme for a system with pre-deterministic access-based common reservation window 510 transmissions. In some implementations, the transmission scheme 500 may implement aspects of WLAN 100 and transmission schemes 200, 300, and 400. For example, the transmission scheme 500 may be used by an AP 105 as discussed with reference to FIGS. 1-4. In some implementations, the transmission scheme 500 may be an instance of the transmission schemes 200, 300, or 400. For example, the common reservation windows 510-*a* and 510-*b* may be examples of the common reservation windows 210, 310 or 410.

An AP 105 may transmit the reservation signal 520 during the common reservation window 510-a and 510-b in order to reserve an scheduled service period during an scheduled medium access which may occur after each common reservation window 510 (an scheduled medium access may occur during time interval 515 in between the common reservation window 510-a and 510-b). The APs 105 may contend during the common reservation windows 510 for the scheduled service periods during using pre-deterministic access. In some implementations, pre-deterministic access may occur within a managed network. That is, the network may have a centralized controller (such as one of the APs 105 or a separate device). In this implementation, the centralized controller may specify some pre-deterministic access parameters and access.

The centralized controller may specify a pre-defined order for transmitting reservation signals 520. That is, APs 105 may transmit reservation signals 520 according to the pre-defined order known at the start of a common reservation window 510. The APs 105 may transmit a reservation signal 520 even if the AP 105 does not intend to reserve an scheduled service period in a subsequent scheduled medium access. Neighboring APs 105 may learn about scheduled service periods that may not be reserved and over-the-air ordering and access. In some implementations, APs 105 may still perform a clear channel assessment (CCA) prior to transmitting a reservation signal 520 as there may be unmanaged APs 105 (and corresponding BSSs) present.

The centralized controller may specify the type of signal for reservation signal 520 transmissions. For example, the centralized controller may specify using a beacon signal, control frames, management frames, or NDP frames for transmitting the reservation signals 520. For example, the centralized controller may determine that the APs 105-m and 105-n are in a neighborhood with few surrounding APs 105 and specify that the APs 105-m and 105-n utilize beacon frames for transmitting their reservation signals 520-a and 520-b respectively. The centralized controller may further determine that APs 105-o and 105-p are in a more crowded neighborhood (such as a neighborhood with more APs 105) and specify that the APs 105-o and 105-p utilize NDP frames for transmitting their reservation signals 520-c and 520-d respectively. In some implementations, the centralized controller may enable the APs 105 to switch the signal types (such as NDP frames, control frames, management frames, beacon signal) for transmitting the reservation signals 520 according to other variables. For example, the centralized controller may specify for the AP 105-m to transmit the reservation signal 520-a in the common reservation window 510-a using a beacon signal. However, the centralized controller may specify for AP 105-m to transmit the reservation signal 520-e in a following common reservation window 510-b using an NDP frame.

The centralized controller may specify whether clear signal transmissions for reservation signals 520 are enabled. That is, the centralized controller may enable clear signal transmissions in the event that reserved scheduled service periods may be overlapping such that an achieved throughput may be degrading. In some implementations, enabling clear signal transmissions may refer to enabling a hidden mode. Here clear signal transmissions may not be shown; however it is to be understood by a person/one having ordinary skill in the art that clear signal transmissions may follow reservation signals 520 in certain implementations. The centralized controller may specify a common reservation window 510 start time which may correspond to a time that APs 105 may begin accessing the medium for sending reservation signals 520. The start time may synchronize APs 105 within the system.

The centralized controller may specify a common reservation window 510 duration which may indicate a duration of time during which APs 105 may be allowed to send their reservation signals 520. The common reservation window 510 duration may be defined according to N×T, where N may be equivalent to the number of APs 105 within the system, and T may be the duration of each individual reservation signal 520 including a shortest interframe spacing (SIFS). The common reservation window 510 duration may be equivalent to 2N×T in the event that the centralized controller has enabled clear signal transmissions. In some implementations, the common reservation window 510 duration may increase if a reservation policy indicates that an AP 105 may use more than one reservation signal 520 to reserve multiple scheduled service periods.

Figure 6:
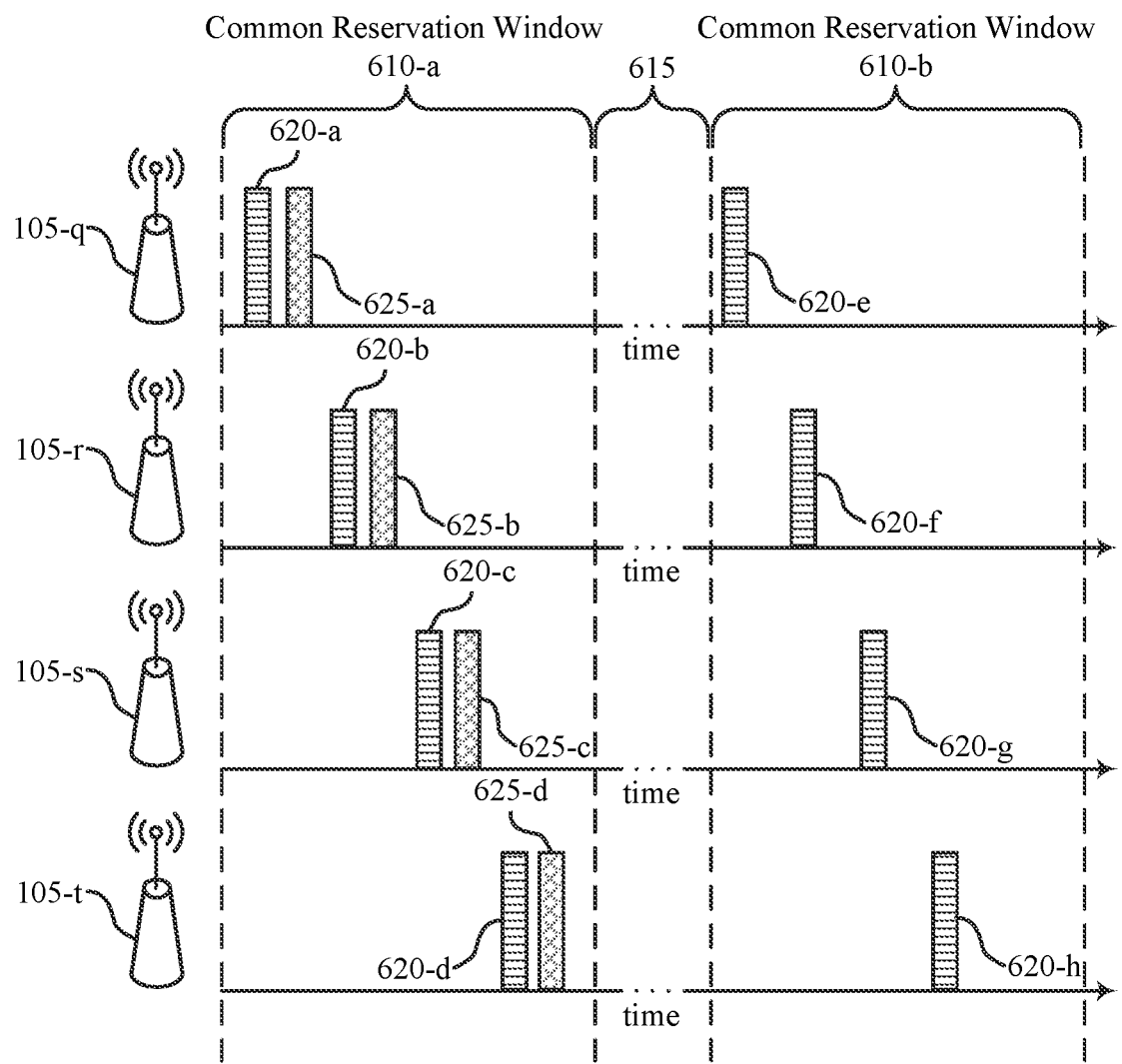

FIG. 6 shows an example of a transmission scheme 600 for coordinated medium access by wireless APs. The transmission scheme 600 may show a transmission scheme for a system with contention-based access-based common reservation window 610 transmissions. In some implementations, the transmission scheme 600 may implement aspects of WLAN 100 and transmission schemes 200, 300, and 400. For example, the transmission scheme 600 may be used by an AP 105 as discussed with reference to FIGS. 1-5. In some implementations, the transmission scheme 600 may be an instance of the transmission schemes 200, 300, or 400. For example, the common reservation windows 610-a and 610-b may be examples of the common reservation windows 210, 310 or 510.

The APs 105 may transmit the reservation signals 620 during the common reservation window 610-a and 610-b in order to reserve an scheduled service period during an scheduled medium access which may occur after each common reservation window 610 (such as an scheduled medium access may occur during time interval 615 in between the common reservation window 610-a and common reservation window 610-b). The APs 105 may contend during the common reservation windows 610 for the scheduled service periods during using contention-based access. In some implementations, a contention-based access-based common reservation window 610 may not include a pre-determined ordering (such as the network may be unmanaged). When the common reservation windows 610 are contention-based access-based, setup and maintenance of network parameters may be handled by the APs 105 in a distributed manner. For example, the contention-based access-based parameters may be determined for a BSS set. In this example, an AP 105 may scan its environment and either create a BSS set or join an existing BSS set with one or more other APs 105. The AP 105 that creates a BSS set may determine the contention-based access-based parameters for that BSS set. For example, the AP 105-q may scan its environment and detect a BSS set including the APs 105-r, 105-s, and 105-t. The AP 105-q may determine to join the BSS set and adapt the contention-based access-based parameters in place for that existing BSS set. In some implementations, an AP 105 may join (such as maintain) more than one BSS set. In some implementations, the contention-based access-based parameters for a BSS set may adapt (such as to account for the number of the APs 105 in the BSS set). In the previous example, the contention-based access-based parameters may adapt in order to account for the additional AP 105-q. That is, the common reservation window 610 duration may increase.

In some implementations, an AP 105 may be configured to set up a BSS set or join an existing BSS. For example, once an AP 105 is associated with a BSS set, the AP 105 may reserve scheduled service periods (such as semipersistent scheduled service periods) using reservation signal 620 transmissions, the reserved scheduled service periods for communications between the AP 105 and its STAs. An AP 105 may not be aware of the presence of all of the other APs 105 within a predefined range from the AP 105. However, the AP 105 may be aware of the contention-based access-based parameters for its BSS set, enabling the AP 105 to effectively transmit reservation signals 620. The contention-based access-based parameters may include a common reservation window 610 start time, a common reservation window 610 duration, an scheduled medium access duration, access policies, or reservation policies.

The contention-based access-based parameters may be set up and maintained by APs 105 in a distributed way. In some implementations, selecting or changing parameters may be determined based on majority voting. This may include APs 105 within a BSS set voting on parameters such as hidden mode, access policies, reservations policies, or common reservation window duration. The APs 105 may determine a limit of a number of APs 105 that may join the BSS set. Additionally, or alternatively, the APs 105 may determine a method for adapting to saturated conditions or conflicts within the BSS set. The APs 105 may determine a type of signal for reservation signals 620. The signal type (such as NDP frames, control frames, management frames, beacon signal) may be dynamic and may be determined based on a size of the BSS set. For example, if the BSS set has few APs 105, the APs 105 may transmit beacons for reservation signal 620 transmissions. Alternatively, if the BSS has more APs 105, the APs 105 may transmit NDP frames for reservation signal 620 transmissions. The APs 105 may determine whether clear signal 625 transmissions are enabled. In some implementations, clear signal 625 transmissions may be enabled by default, which may mitigate collisions of reservation signal 620 frames. APs 105 may additionally use (such as in addition to transmitting clear signals 625) (MU-) RTS/CTS during scheduled service periods to resolve potential conflicts.

The APs 105 within a BSS set may determine how APs 105 within the BSS set may contend for sending reservation signal 620 frames. For example, the APs 105 may determine how APs 105 are to contend, priority for contention, etc. In some implementations, the APs 105 within a BSS may perform a CCA (such as the APs 105 may use ED) and access the medium after counting down (such as after EDCA). The APs 105 within a BSS may set determine a common reservation window 610 duration. The duration may depend on a number of APs 105 within the BSS set (such as a number of APs 105 that may plan to contend for the medium). Additionally, or alternatively, the duration may depend on a reservation signal/CS duration. The duration for the common reservation window 610 may change over time (such as APs 105 join or leave the BSS set). The common reservation window 610 duration may increase in the case that APs 105 may use multiple reservation signals 620 to reserve multiple scheduled service periods.

The APs 105 within a BSS set may determine a start time for the common reservation windows 610. The start time may correspond to a time where the APs 105 may start to contend for sending reservation signals 620. The start time may be a common time reference for neighboring APs 105 to coordinate the coordinated medium intervals and schedules. There may be synchronization of common reservation window 610 start times across more than one AP 105 within a BSS set. In some implementations, a synchronization algorithm (such as a NAN-style synchronization algorithm) may be used for timing alignments. The APs 105 may determine a leader selection and a cluster ID for such a synchronization algorithm. In some other implementations, a synchronized start time for common reservation windows 610 may be adapted to be the lowest common reservation window 610 start time across all APs 105 within the BSS set. In some other implementations, the APs 105 within the BSS set may determine a synchronized start time for common reservation windows 610 by a majority vote.

Figure 7:
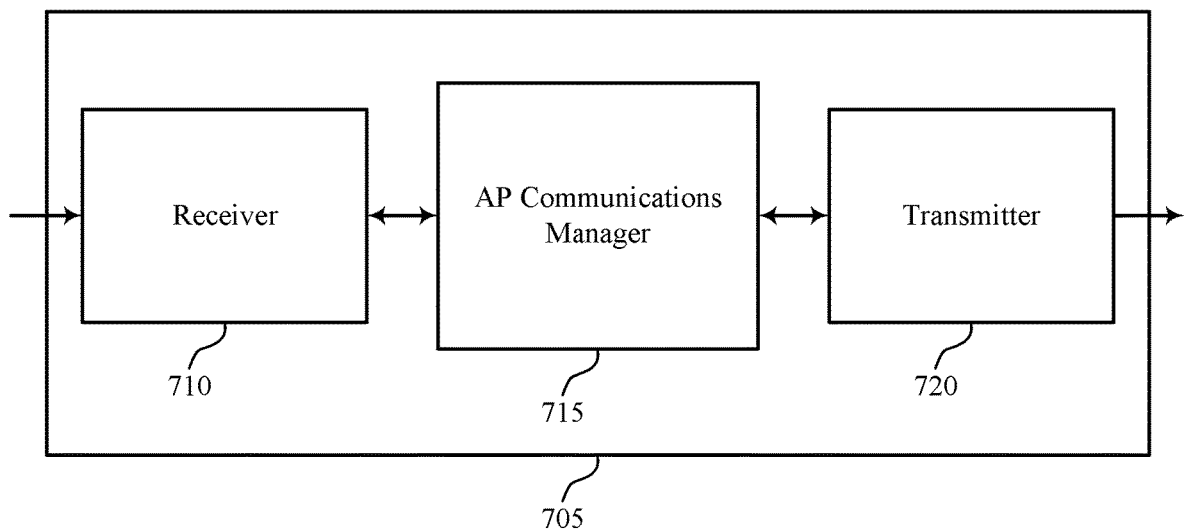
FIGS. 7-9 show examples of devices that support coordinated medium access.

FIG. 7 shows a block diagram 700 of a wireless device 705 that supports coordinated medium access. Wireless device 705 may implement aspects of an access point (AP) 105 as described herein. Wireless device 705 may include a receiver 710, an AP communications manager 715, and a transmitter 720. The wireless device 705 also may include a processor. Each of these components may be in communication with one another (such as via one or more buses).

The receiver 710 may receive information such as packets, user data, or control information associated with various information channels (such as control channels, data channels, and information related to coordinated medium access, etc.). Information may be passed on to other components of the device. The receiver 710 may implement aspects of the transceiver 1035 described with reference to FIG. 10. The receiver 710 may utilize a single antenna or a set of antennas.

AP communications manager 715 may implement aspects of the AP communications manager 1015 described with reference to FIG. 10.

The AP communications manager 715 and at least some of its various sub-components may be implemented in hardware, software executed by a processor, firmware, or any combination thereof. If implemented in software executed by a processor, the functions of the AP communications manager 715 and at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The AP communications manager 715 and at least some of its various sub-components may be physically located at various positions, including being distributed such that portions of functions are implemented at different physical locations by one or more physical devices. In some implementations, AP communications manager 715 and at least some of its various sub-components may be a separate and distinct component. In some other implementations, AP communications manager 715 and at least some of its various sub-components may be combined with one or more other hardware components, including but not limited to an I/O component, a transceiver, a network server, another computing device, one or more other components described in the present disclosure, or a combination thereof.

The AP communications manager 715 may identify a time interval associated with a wireless channel of a radio frequency spectrum band, transmit a reservation signal over the wireless channel during the coordinated reservation period of the time interval, the reservation signal indicating a service period reserved by a first access point from the set of service periods of the time interval, and send or receive one or more transmissions during the service period reserved by the first access point. In some implementations, the one or more transmissions may include a downlink transmission to a station or an uplink transmission from a station. In some implementations, the AP communications manager 715 may aid in setting up peer-to-peer communication links between multiple stations in a BSS associated with the access point. The peer-to-peer communication links may include a TDLS link. In some implementations, the time interval may include a coordinated reservation period for the wireless channel and a set of discrete service periods The transmitter 720 may transmit signals generated by other components of the device. In some implementations, the transmitter 720 may be collocated with a receiver 710 in a transceiver module. For example, the transmitter 720 may implement aspects of the transceiver 1035 described with reference to FIG. 10. The transmitter 720 may utilize a single antenna or a set of antennas.

Figure 8:
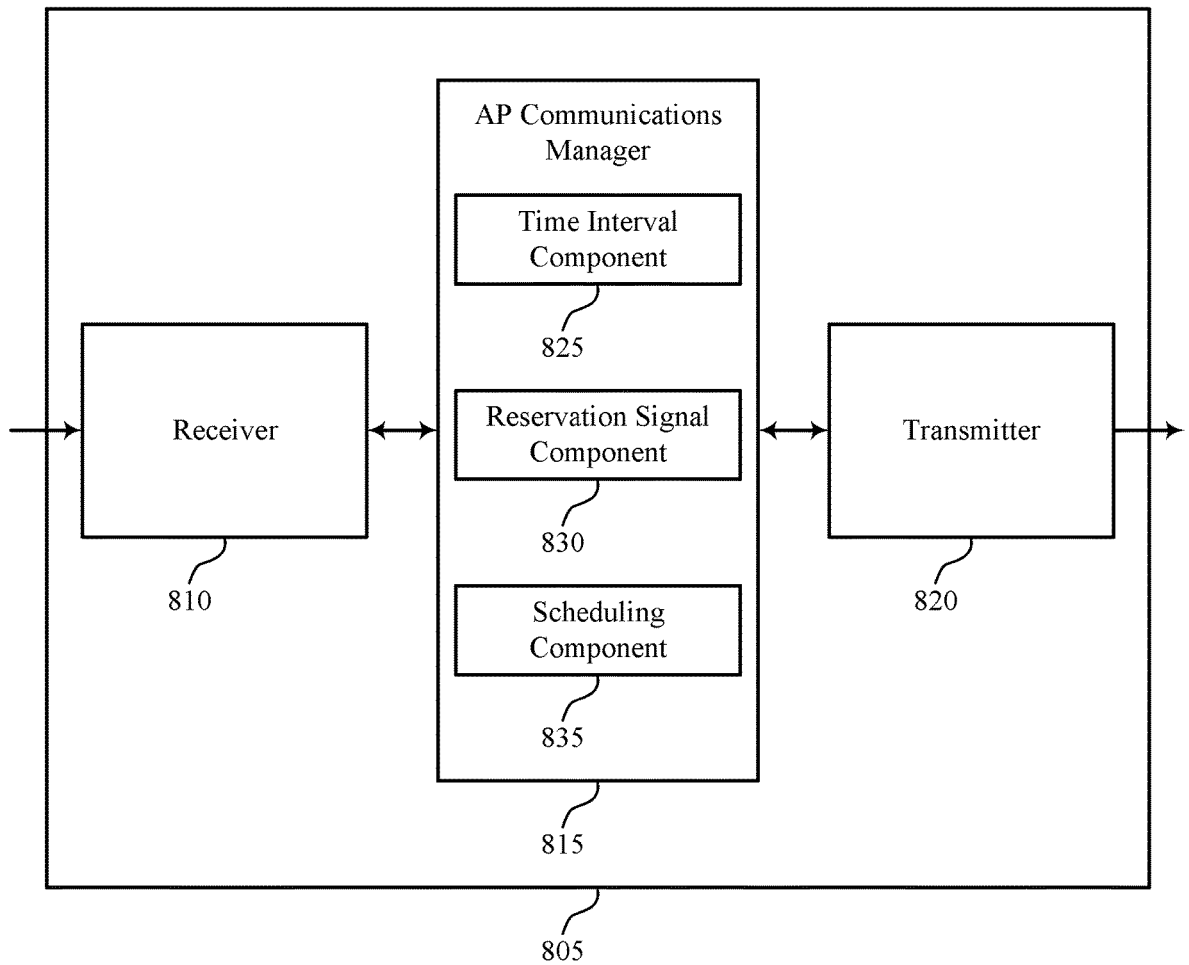

FIG. 8 shows a block diagram 800 of a wireless device 805 that supports coordinated medium access. The wireless device 805 may implement aspects of a wireless device 705 or an AP 105 as described with reference to FIG. 7. The wireless device 805 may include receiver 810, AP communications manager 815, and transmitter 820. The wireless device 805 also may include a processor. Each of these components may be in communication with one another (such as via one or more buses).

The receiver 810 may receive information such as packets, user data, or control information associated with various information channels (such as control channels, data channels, and information related to coordinated medium access, etc.). Information may be passed on to other components of the device. The receiver 810 may implement aspects of the transceiver 1035 described with reference to FIG. 10. The receiver 810 may utilize a single antenna or a set of antennas.

The AP communications manager 815 may implement aspects of the AP communications manager 1015 described with reference to FIG. 10. The AP communications manager 815 also may include time interval component 825, reservation signal component 830, and scheduling component 835.

The time interval component 825 may identify a time interval associated with a wireless channel of a radio frequency spectrum band, the time interval including a coordinated reservation period for the wireless channel and a set of discrete service periods.

The reservation signal component 830 may transmit a reservation signal over the wireless channel during the coordinated reservation period of the time interval, the reservation signal indicating one or more service periods reserved by the first access point from the set of service periods of the time interval, transmit the reservation signal based on one or more of the received parameters, and transmit the reservation signal based on one or more of the identified parameters. In some implementations, the reservation signal may be at least one of a management frame, or control frame, an NDP frame, or a beacon or a new reservation frame. The reservation signal component 830 may receive an initial signal indicating one or more service periods reserved by a second access point. The reservation signal component 830 may determine, based on receiving the initial signal, a subset of service periods of the time interval that are available for reservation, where the one or more service periods reserved by the first access point may be based on determining the subset of service periods. In some implementations, the initial signal may be a clear signal received from a station associated with the second access point. In some other implementations, the initial signal may be a reservation signal received from the second access point.

The scheduling component 835 may schedule a downlink transmission to a station or an uplink transmission from the station during the service period reserved by the first access point.

The transmitter 820 may transmit signals generated by other components of the device. In some implementations, the transmitter 820 may be collocated with a receiver 810 in a transceiver module. For example, the transmitter 820 may implement aspects of the transceiver 1035 described with reference to FIG. 10. The transmitter 820 may utilize a single antenna or a set of antennas.

Figure 9:
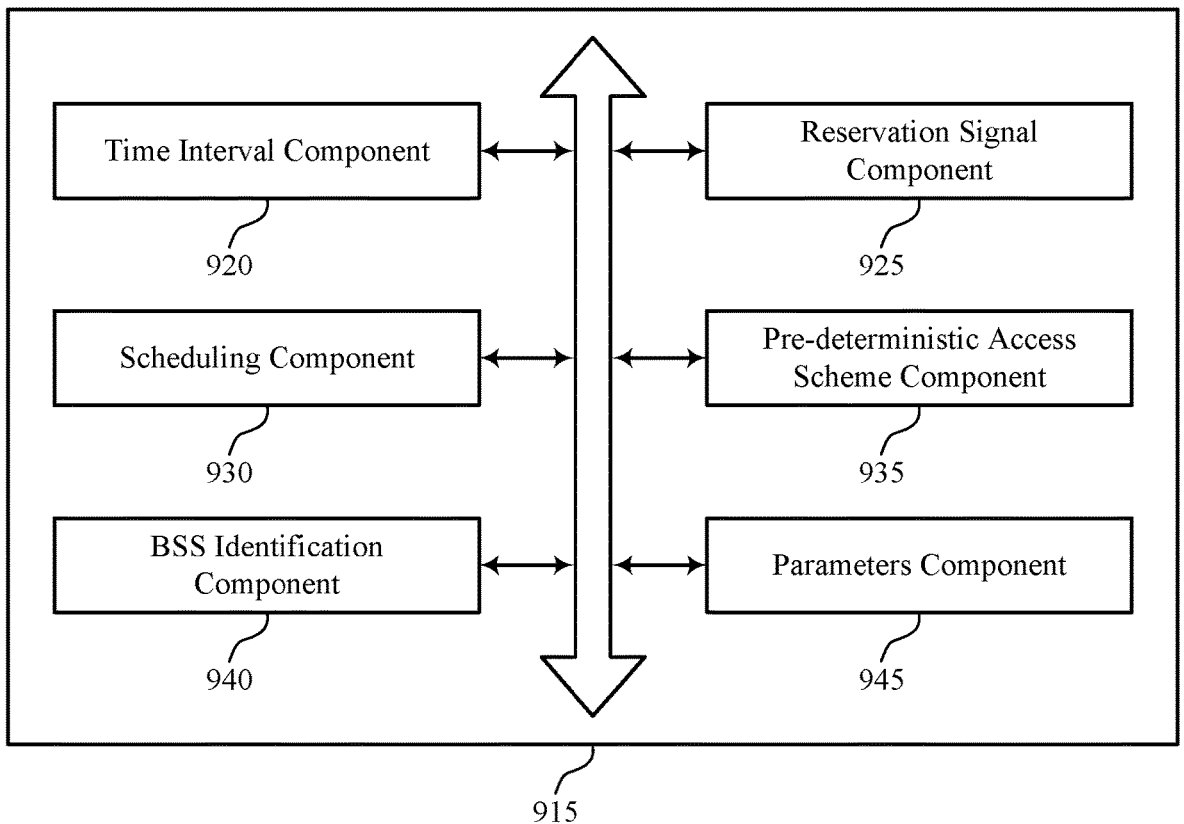

FIG. 9 shows a block diagram 900 of an AP communications manager 915 that supports coordinated medium access. The AP communications manager 915 may implement aspects of an AP communications manager 715, an AP communications manager 815, or an AP communications manager 1015 described with reference to FIGS. 7, 8, and 10. The AP communications manager 915 may include time interval component 920, reservation signal component 925, scheduling component 930, pre-deterministic access scheme component 935, BSS identification component 940, and parameters component 945. Each of these modules may communicate, directly or indirectly, with one another (such as via one or more buses).

The time interval component 920 may identify a time interval associated with a wireless channel of a radio frequency spectrum band, the time interval including a coordinated reservation period for the wireless channel and a set of discrete service periods.

The reservation signal component 925 may transmit a reservation signal over the wireless channel during the coordinated reservation period of the time interval, the reservation signal indicating a service period reserved by a first access point from the set of service periods of the time interval. In some implementations, reservation signal component 925 may transmit the reservation signal based on one or more of the received parameters. In some implementations, the reservation signal is at least one of a management frame or a control frame. In some implementations, the reservation signal includes at least one of an NDP frame or a beacon.

The scheduling component 930 may send or receive one or more transmissions during the one or more service periods reserved by the first access point. In some implementations, the scheduling component 930 may send a downlink transmission to a station or receive an uplink transmission from a station during the one or more service periods reserved by the first access point. In some implementations, the scheduling component 930 may schedule the downlink transmission to the station or the uplink transmission from the station during the one or more service periods reserved by the first access point. The pre-deterministic access scheme component 935 may receive a set of parameters associated with a pre-deterministic access scheme for reserving the wireless channel. In some implementations, receiving the set of parameters may include receiving the set of parameters from a central controller. In some other implementations, receiving the set of parameters may include receiving the set of parameters from a distributed AP. In some implementations, the set of parameters includes at least one of a start time of the coordinated reservation period, a duration of the coordinated reservation period, a duration of the set of discrete service periods, an access order, or a set of reservation policies. In some implementations, the start time of the coordinated reservation period may be synchronized for a plurality of access points. The BSS identification component 940 may identify a BSS associated with a set of access points. The parameters component 945 may identify a set of parameters associated with the BSS, where the set of parameters includes at least one of a start time of the coordinated reservation period, a duration of the coordinated reservation period, a duration of the set of discrete service periods, a set of access policies, or a set of reservation policies. In some implementations, the start time of the coordinated reservation period may be synchronized for a plurality of access points.

Figure 10:
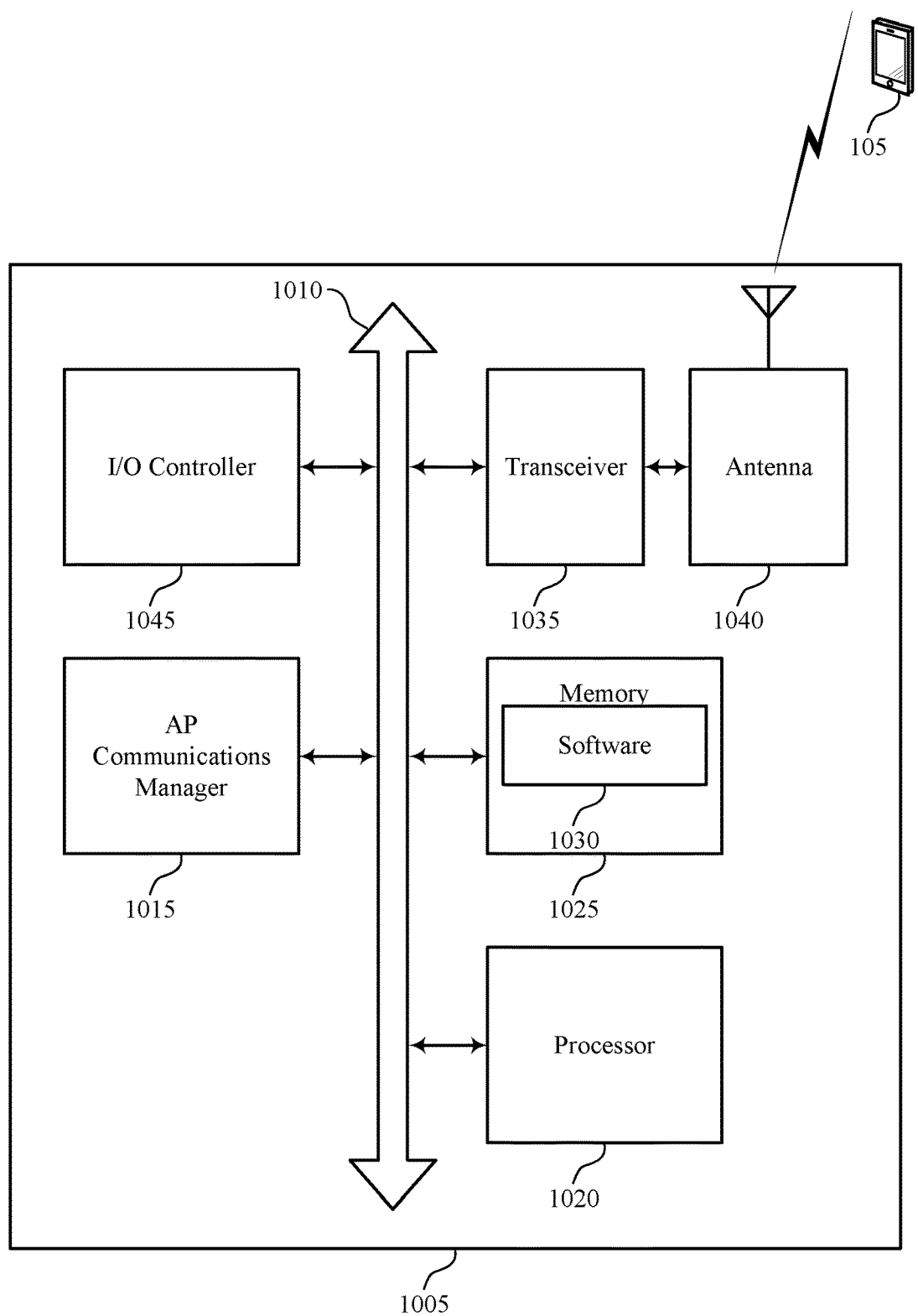
FIG. 10 shows an example of a system that supports coordinated medium access.

FIG. 10 shows a diagram of a system 1000 including a device 1005 that supports coordinated medium access. The device 1005 may be an example of or include the components of wireless device 705, wireless device 805, or a AP 105 as described above, such as with reference to FIGS. 1, 7 and 8. The device 1005 may include components for bi-directional voice and data communications including components for transmitting and receiving communications, including an AP communications manager 1015, a processor 1020, memory 1025, software 1030, a transceiver 1035, antenna(s) 1040, and an I/O controller 1045. These components may be in electronic communication via one or more buses (such as bus 1010). The AP communications manager 1015 may implement aspects of the AP communications manager 815 described with reference to FIG. 8.

Figure 11:
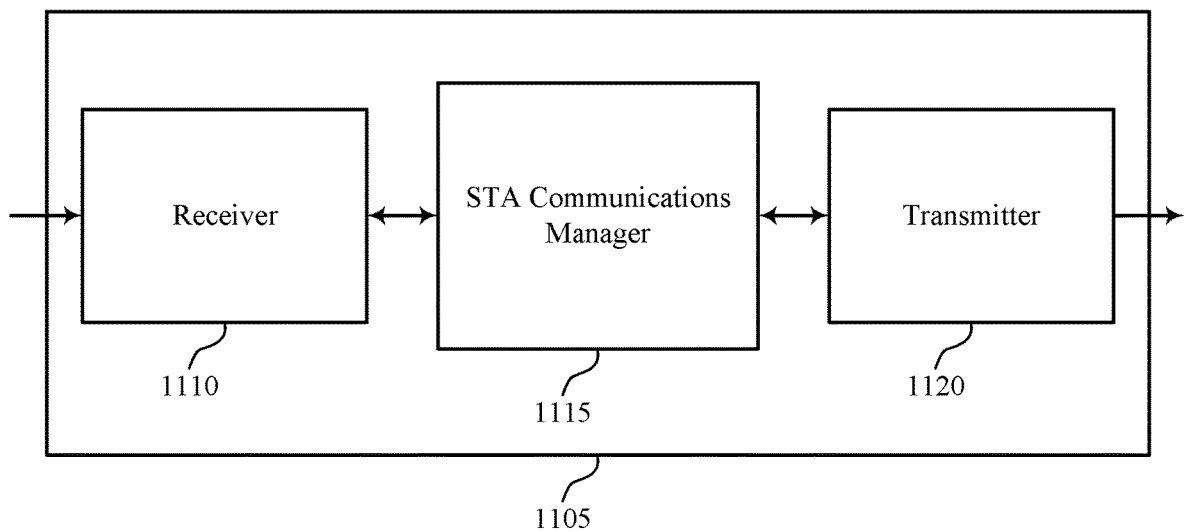
FIGS. 11-13 show examples of devices that support coordinated medium access.

FIG. 11 shows a block diagram 1100 of a wireless device 1105 that supports coordinated medium access. The wireless device 1105 may implement aspects of a STA 115 as described herein. The wireless device 1105 may include a receiver 1110, a STA communications manager 1115, and a transmitter 1120. The wireless device 1105 also may include a processor. Each of these components may be in communication with one another (such as via one or more buses).

The receiver 1110 may receive information such as packets, user data, or control information associated with various information channels (such as control channels, data channels, and information related to coordinated medium access, etc.). Information may be passed on to other components of the device. The receiver 1110 and transmitter 1120 may implement aspects of the transceiver 1035 described with reference to FIG. 10. The receiver 1110 and transmitter 1120 may utilize a single antenna or a set of antennas.

The STA communications manager 1115 may implement aspects of the STA communications manager 1415 described with reference to FIG. 14. The STA communications manager 1115 may identify a time interval associated with a wireless channel of a radio frequency spectrum band, wake up a receiver of the station during the coordinated reservation period of the time interval to receive a reservation signal from an access point associated with the station, wake up the receiver of the station during the service period reserved by the access point, and send or receive one or more transmissions during the service period reserved by the access point. In some implementations, the time interval may include a coordinated reservation period for the wireless channel and a set of discrete service periods. In some implementations, the reservation signal may indicate a service period reserved by the access point from the set of service periods of the time interval.

Figure 12:
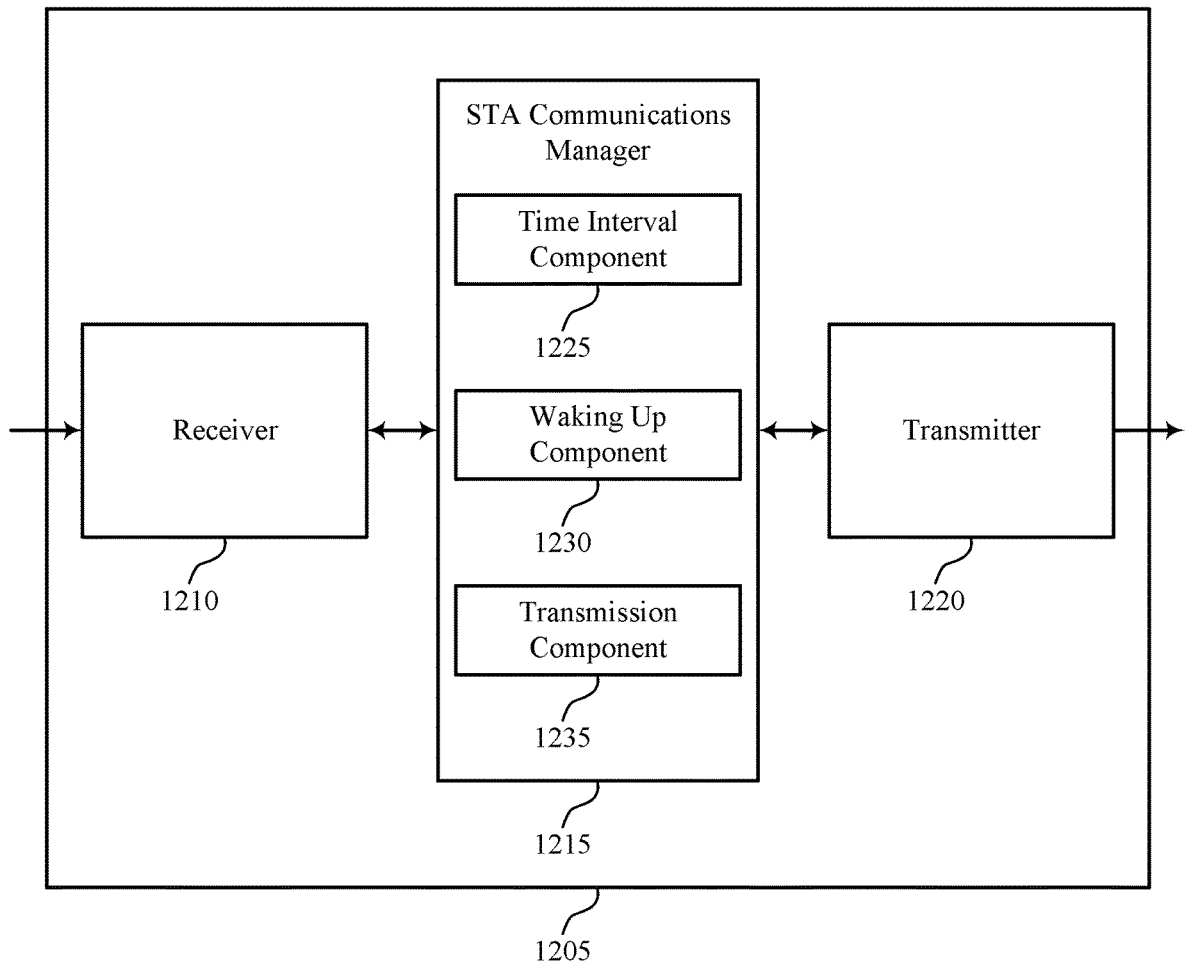

FIG. 12 shows a block diagram 1200 of a wireless device 1205 that supports coordinated medium access. Wireless device 1205 may implement aspects of a wireless device 1105 or a STA 115 as described with reference to FIG. 1 or FIG. 11. Wireless device 1205 may include a receiver 1210, a STA communications manager 1215, and transmitter 1220.

Wireless device 1205 also may include a processor. Each of these components may be in communication with one another (such as via one or more buses).

The receiver 1210 may receive information such as packets, user data, or control information associated with various information channels (such as control channels, data channels, and information related to coordinated medium access, etc.). The STA communications manager 1215 may implement aspects of the STA communications manager 1415 described with reference to FIG. 14. STA communications manager 1215 also may include time interval component 1225, waking up component 1230, and transmission component 1235.

The time interval component 1225 may identify a time interval associated with a wireless channel of a radio frequency spectrum band, the time interval including a coordinated reservation period for the wireless channel and a set of discrete service periods.

The waking up component 1230 may wake up a receiver of the station during the coordinated reservation period of the time interval to receive a reservation signal from an access point associated with the station, and wake up the receiver of the station during service period reserved by the access point. In some implementations, the reservation signal may indicate a service period reserved by the access point from the set of service periods of the time interval. In some implementations, the waking up component 1230 may receive a beacon signal indicating a mapping of uplink or downlink transmissions for the service period reserved by the access point. The waking up component 1230 may wake up the receiver of the station during the service period based on receiving the beacon signal.

The transmission component 1235 may send or receive one or more transmissions during the service period reserved by the access point. In some implementations, the one or more transmissions may include transmissions in a BSS associated with the access point. For example, the one or more transmissions may include an uplink transmission to the access point and a downlink transmission from the access point. In some implementations, the one or more transmissions may include peer-to-peer communications (such as TDLS links) with one or more stations included in a BSS.

The transmitter 1220 may transmit signals generated by other components of the device. In some implementations, the transmitter 1220 may be collocated with a receiver 1210 in a transceiver module. For example, the transmitter 1220 may implement aspects of the transceiver 1435 described with reference to FIG. 14. The transmitter 1220 may utilize a single antenna or a set of antennas.

Figure 13:
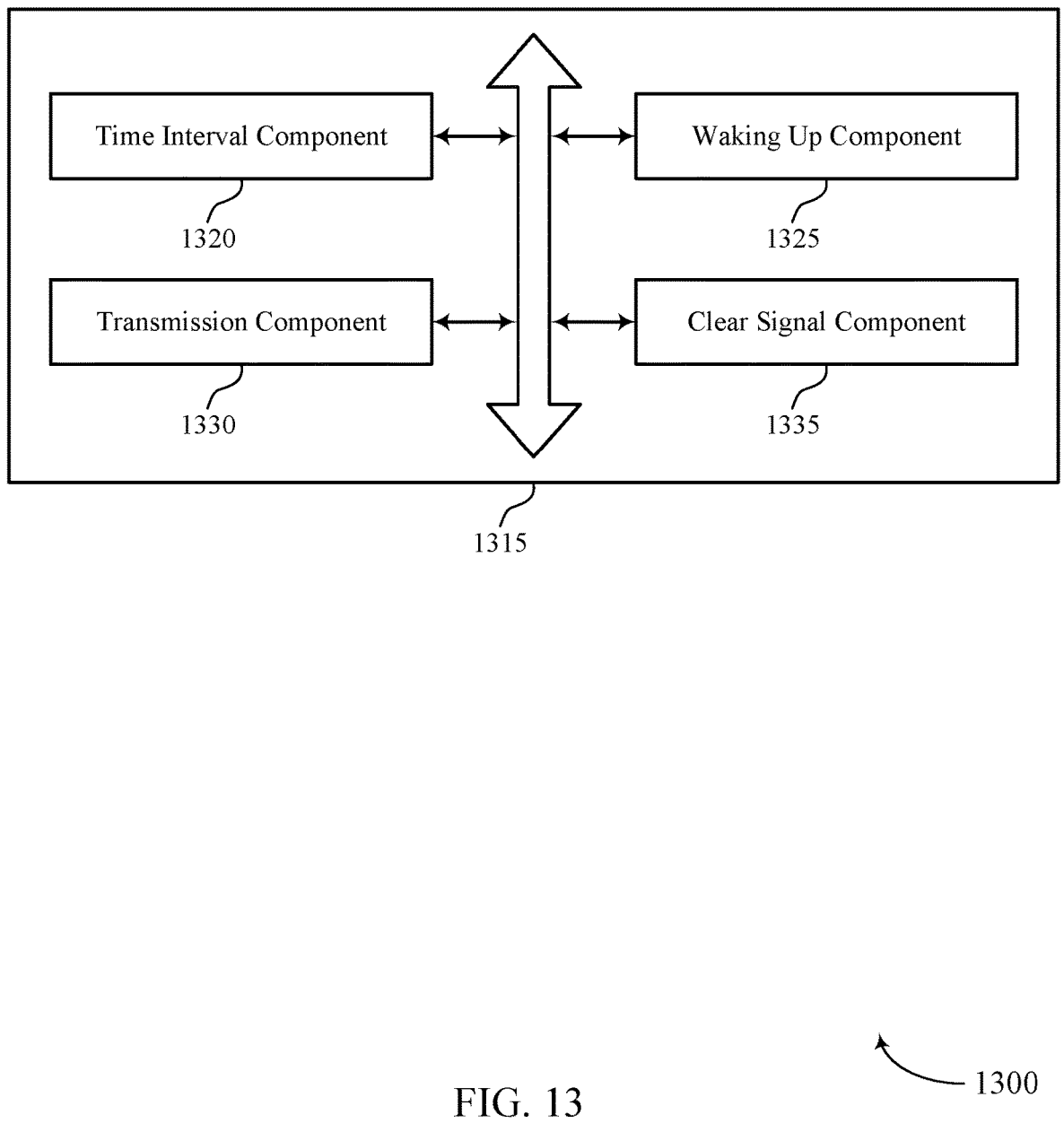

FIG. 13 shows a block diagram 1300 of a STA communications manager 1315 that supports coordinated medium access. The STA communications manager 1315 may implement aspects of a STA communications manager 1415 described with reference to FIGS. 11, 12, and 14. The STA communications manager 1315 may include time interval component 1320, waking up component 1325, transmission component 1330, and clear signal component 1335. Each of these modules may communicate, directly or indirectly, with one another (such as via one or more buses).

The time interval component 1320 may identify a time interval associated with a wireless channel of a radio frequency spectrum band, the time interval including a coordinated reservation period for the wireless channel and a set of discrete service periods.

The waking up component 1325 may wake up a receiver of the station during the coordinated reservation period of the time interval to receive a reservation signal from an access point associated with the station, the reservation signal indicating a service period reserved by the access point from the set of service periods of the time interval and wake up the receiver of the station during the service period reserved by the access point.

The transmission component 1330 may send or receive one or more transmissions during the service period reserved by the access point. In some implementations, the transmission component 1330 may perform an uplink transmission to the access point or receive a downlink transmission from the access point during the service period reserved by the access point.

The clear signal component 1335 may transmit a clear signal over the wireless channel during the coordinated reservation period of the time interval based on the reservation signal from the access point.

Figure 14:
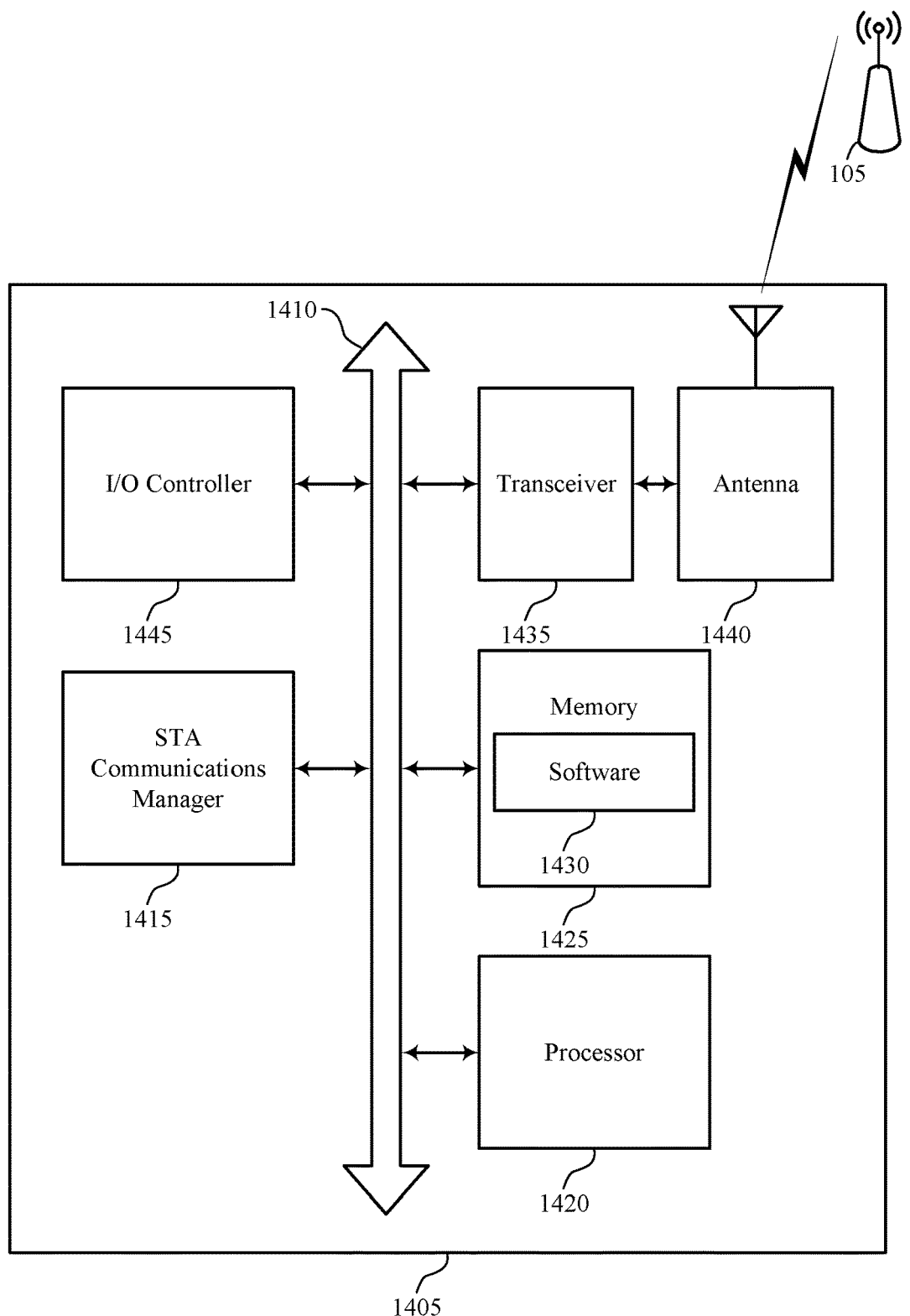
FIG. 14 shows an example of a system that supports coordinated medium access.

FIG. 14 shows a diagram of a system 1400 including a device 1405 that supports coordinated medium access. Device 1405 may be an example of or include the components of STA 115 as described above, such as with reference to FIG. 1. Device 1405 may include components for bi-directional voice and data communications including components for transmitting and receiving communications, including a STA communications manager 1415, a processor 1420, memory 1425, software 1430, a transceiver 1435, antenna(s) 1440, and an I/O controller 1445. These components may be in electronic communication via one or more buses (such as bus 1410). The STA communications manager 1415 may implement aspects of the STA communications manager 1215 described with reference to FIG. 12.

Figure 15:
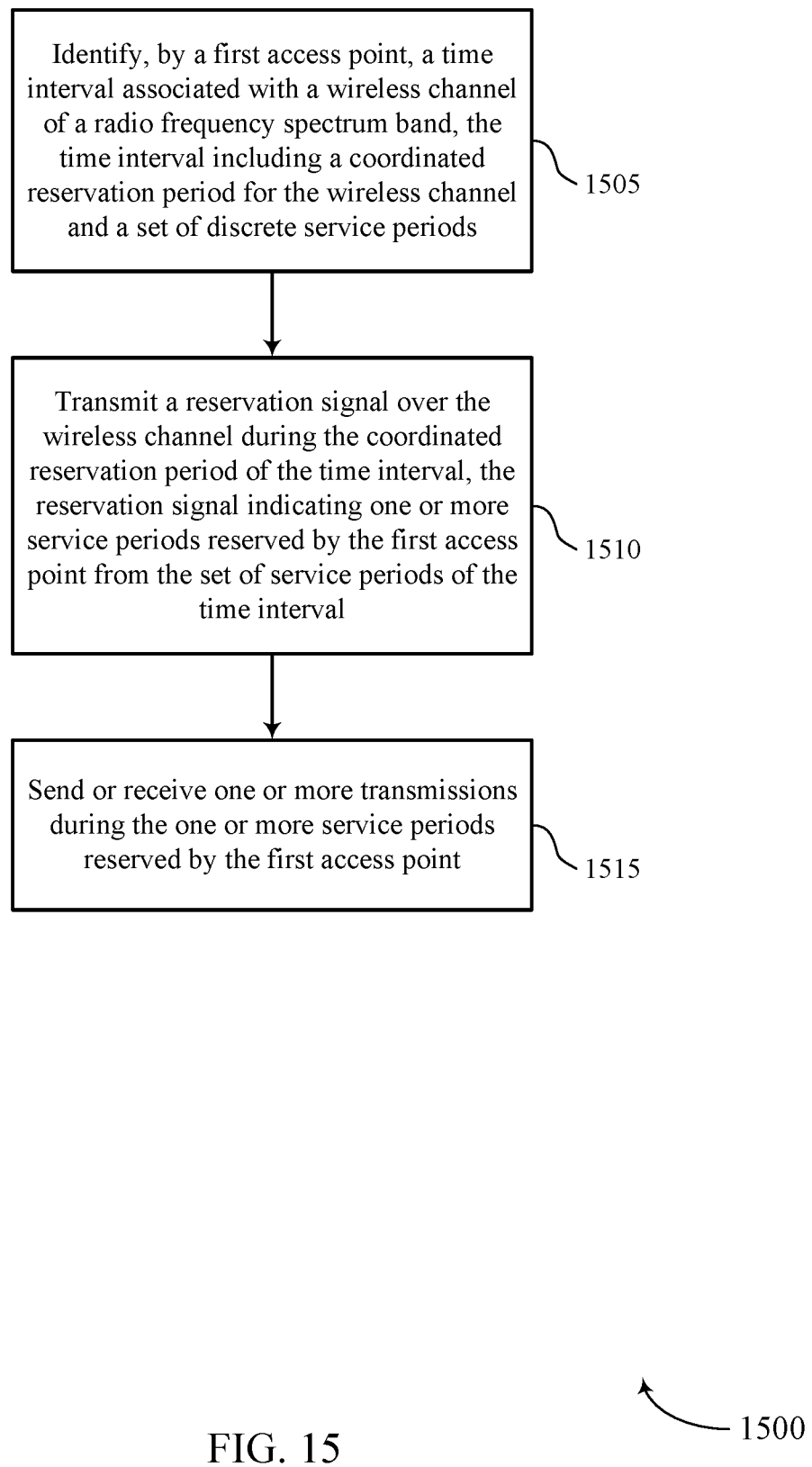
FIGS. 15-17 show examples of methods for coordinated medium access.

FIG. 15 shows a flowchart illustrating a method 1500 for coordinated medium access. The operations of method 1500 may be implemented by a AP 105 or its components as described herein. For example, the operations of method 1500 may be performed by a AP communications manager as described with reference to FIGS. 7-10. In some implementations, an AP 105 may execute a set of codes to control the functional elements of the device to perform the functions described below. Additionally, or alternatively, the AP 105 may perform aspects of the functions described below using special-purpose hardware.

At block 1505 the AP 105 may identify, by a first access point, a time interval associated with a wireless channel of a radio frequency spectrum band, the time interval including a coordinated reservation period for the wireless channel and a number of discrete service periods. The operations of block 1505 may be performed according to the methods described herein. In some implementations, aspects of the operations of block 1505 may be performed by a time interval component as described with reference to FIGS. 7-10.

At block 1510 the AP 105 may transmit a reservation signal over the wireless channel during the coordinated reservation period of the time interval, the reservation signal indicating one or more service periods reserved by the first access point from the plurality of service periods of the time interval. The operations of block 1510 may be performed according to the methods described herein. In some implementations, aspects of the operations of block 1510 may be performed by a reservation signal component as described with reference to FIGS. 7-10.

At block 1515 the AP 105 may send or receive one or more transmissions during the one or more service periods reserved by the first access point. In some implementations, the AP 105 may schedule a downlink transmission to a station or an uplink transmission from the station during the one or more service periods reserved by the first access point. The operations of block 1515 may be performed according to the methods described herein. In some implementations, aspects of the operations of block 1515 may be performed by a scheduling component as described with reference to FIGS. 7-10.

Figure 16:
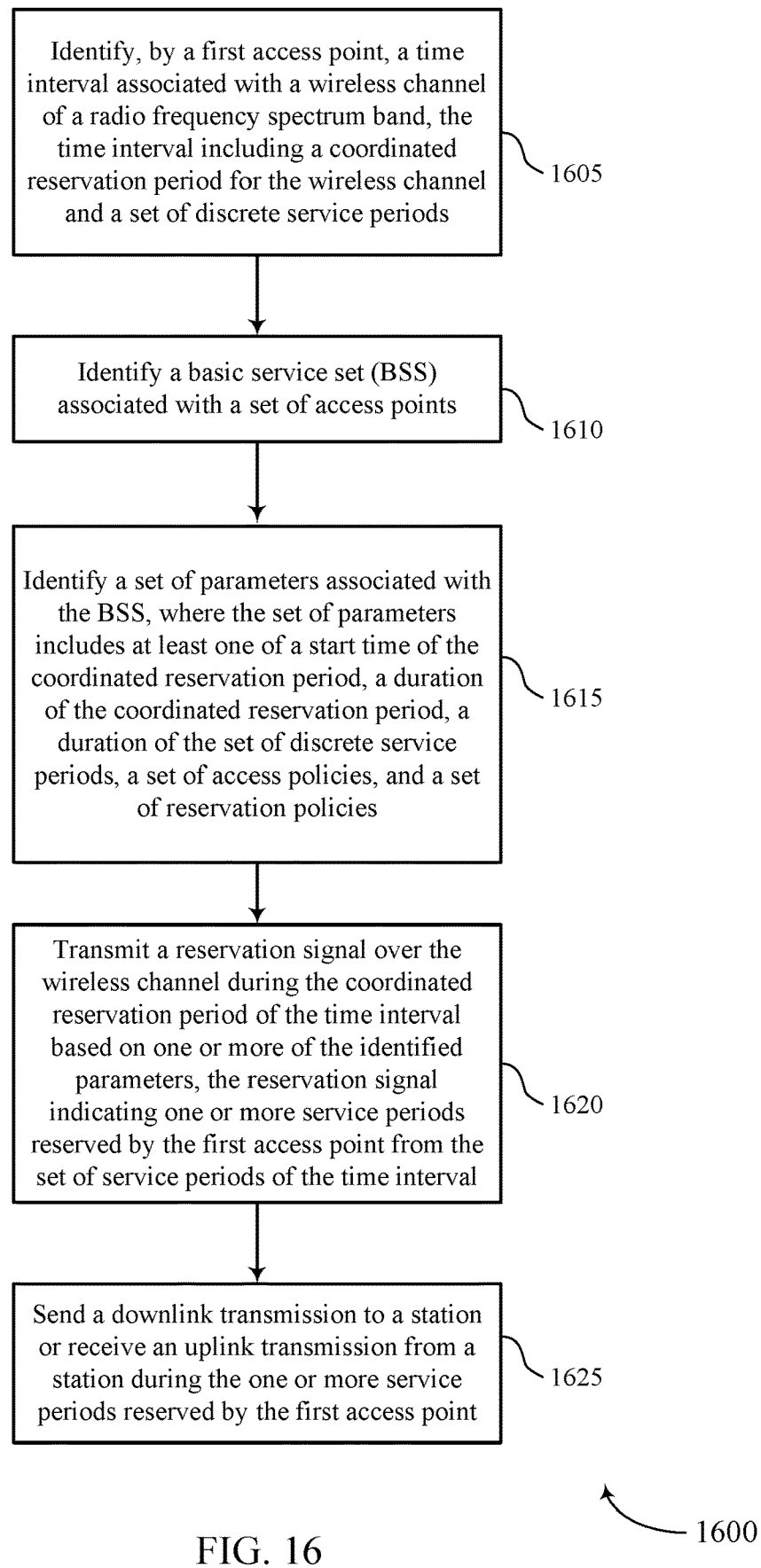

FIG. 16 shows a flowchart illustrating a method 1600 for coordinated medium access. The operations of method 1600 may be implemented by a AP 105 or its components as described herein. For example, the operations of method 1600 may be performed by a AP communications manager as described with reference to FIGS. 7-10. In some implementations, a AP 105 may execute a set of codes to control the functional elements of the device to perform the functions described below. Additionally, or alternatively, the AP 105 may perform aspects of the functions described below using special-purpose hardware.

At block 1605 the AP 105 may identify a time interval associated with a wireless channel of a radio frequency spectrum band, the time interval including a coordinated reservation period for the wireless channel and a number of discrete service periods. The operations of block 1605 may be performed according to the methods described herein. In some implementations, aspects of the operations of block 1605 may be performed by a time interval component as described with reference to FIGS. 7-10.

At block 1610 the AP 105 may identify a BSS associated with a number of access points. The operations of block 1610 may be performed according to the methods described herein. In some implementations, aspects of the operations of block 1610 may be performed by a BSS identification component as described with reference to FIGS. 7-10.

At block 1615 the AP 105 may identify, by a first access point, a number of parameters associated with the BSS. In some implementations, the plurality of parameters includes at least one of a start time of the coordinated reservation period, a duration of the coordinated reservation period, a duration of the plurality of discrete service periods, a number of access policies, or a number of reservation policies. The operations of block 1615 may be performed according to the methods described herein. In some implementations, aspects of the operations of block 1615 may be performed by a parameter component as described with reference to FIGS. 7-10.

At block 1620 the AP 105 may transmit a reservation signal over the wireless channel during the coordinated reservation period of the time interval based at least in part on one or more of the identified parameters, the reservation signal indicating one or more service periods reserved by the first access point from the plurality of service periods of the time interval. The operations of block 1620 may be performed according to the methods described herein. In some implementations, aspects of the operations of block 1620 may be performed by a reservation signal component as described with reference to FIGS. 7-10.

At block 1625 the AP 105 may send a downlink transmission to a station or receive an uplink transmission from a station during the one or more service periods reserved by the first access point. The operations of block 1625 may be performed according to the methods described herein. In some implementations, aspects of the operations of block 1625 may be performed by a scheduling component as described with reference to FIGS. 7-10.

Figure 17:
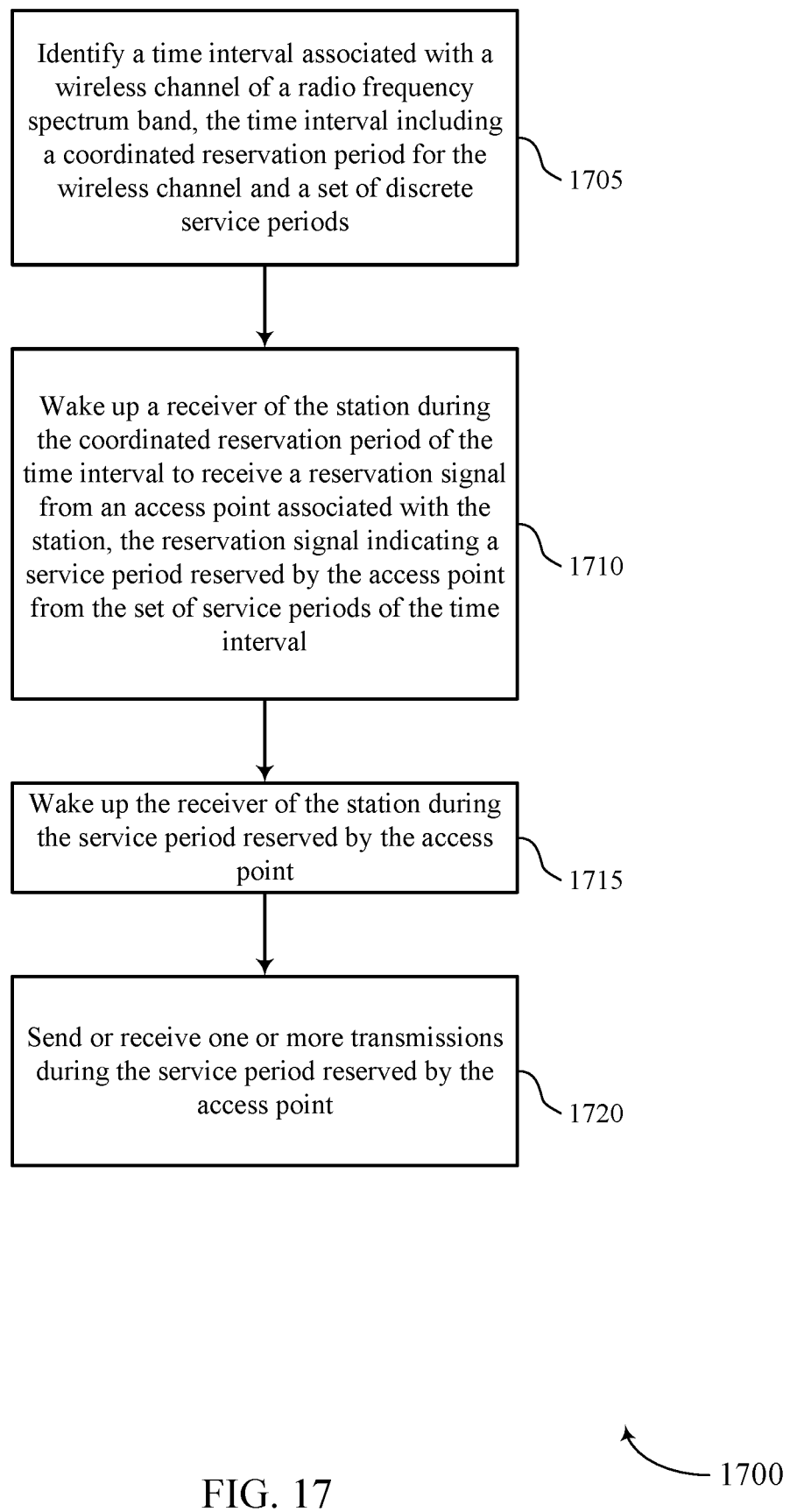

FIG. 17 shows a flowchart illustrating a method 1700 for coordinated medium access. The operations of method 1700 may be implemented by a STA 115 or its components as described herein. For example, the operations of method 1700 may be performed by a STA communications manager as described with reference to FIGS. 11-14. In some implementations, a STA 115 may execute a set of codes to control the functional elements of the device to perform the functions described below. Additionally, or alternatively, the STA 115 may perform aspects of the functions described below using special-purpose hardware.

At block 1705 the STA 115 may identify a time interval associated with a wireless channel of a radio frequency spectrum band, the time interval including a coordinated reservation period for the wireless channel and a number of discrete service periods. The operations of block 1705 may be performed according to the methods described herein. In some implementations, aspects of the operations of block 1705 may be performed by a time interval component as described with reference to FIGS. 11-14.

At block 1710 the STA 115 may wake up a receiver of the station during the coordinated reservation period of the time interval to receive a reservation signal from an access point associated with the station, the reservation signal indicating a service period reserved by the first access point from the plurality of service periods of the time interval. The operations of block 1710 may be performed according to the methods described herein. In some implementations, aspects of the operations of block 1710 may be performed by a waking up component as described with reference to FIGS. 11-14.

At block 1715 the STA 115 may wake up the receiver of the station during the service period reserved by the access point. The operations of block 1715 may be performed according to the methods described herein. In some implementations, aspects of the operations of block 1715 may be performed by a waking up component as described with reference to FIGS. 11-14.

At block 1720 the STA 115 may send or receive one or more transmissions during the service period reserved by the access point. In some implementations, the STA 115 may send an uplink transmission to the access point or receive a downlink transmission from the access point during the service period reserved by the access point. The operations of block 1720 may be performed according to the methods described herein. In some implementations, aspects of the operations of block 1720 may be performed by a transmission component as described with reference to FIGS. 11-14.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures, and indicate relative positions corresponding to the orientation of the Figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some implementations be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications at a first access point (AP), comprising:
   one or more processors;
   one or more memories coupled with the one or more processors; and
   instructions stored in the one or more memories and executable by the one or more processors to cause the apparatus to:
      transmit, in accordance with an access order for APs to transmit reservation signals and in accordance with an access scheme for the first AP to reserve a wireless channel of a radio frequency spectrum band during at least a portion of time resources that are associated with the wireless channel and that are available to a plurality of APs including the first AP, a reservation signal over the wireless channel to reserve multiple service periods associated with the wireless channel,
      wherein each service period of the multiple service periods is configured for communications between a respective AP of the plurality of APs and respective one or more stations associated with the respective AP, between the respective AP and respective one or more APs of the plurality of APs, or any combination thereof, and
      wherein the reservation signal indicates the multiple service periods reserved by the first AP; and
      communicate with at least one or more stations associated with the first AP during the multiple service periods reserved by the first AP based at least in part on the reservation signal.

2. The apparatus of claim 1, wherein the instructions are further executable by the one or more processors to cause the apparatus to:
   receive one or more access scheme parameters associated with the access scheme, the one or more access scheme parameters comprising the access order for each respective AP of the plurality of APs to transmit respective reservation signals; and
   transmit the reservation signal in accordance with the access order for the access scheme.

3. The apparatus of claim 2, wherein the one or more access scheme parameters further comprise a start time of a coordinated reservation period included in a time interval associated with the wireless channel, a duration of the coordinated reservation period, a duration of a plurality of service periods that includes the multiple service periods, one or more reservation policies, a reservation signal type, a clear signal enablement indication, or any combination thereof.

4. The apparatus of claim 2, wherein the instructions are further executable by the one or more processors to cause the apparatus to:
   receive, during a coordinated reservation period included in a time interval associated with the wireless channel, an initial signal indicating another multiple service periods reserved by another AP, the multiple service periods reserved by the first AP being based at least in part on receiving the initial signal, wherein communications of the another AP during the another multiple service periods are prioritized over communications for remaining APs of the plurality of APs.

5. The apparatus of claim 2, wherein the instructions are further executable by the one or more processors to cause the apparatus to:
   receive the one or more access scheme parameters from a central controller.

6. The apparatus of claim 1, wherein the instructions are further executable by the one or more processors to cause the apparatus to:
   receive one or more access scheme parameters associated with a service set and comprising an indication to perform a channel availability sensing operation, the service set being associated with the plurality of APs;
   perform the channel availability sensing operation to determine availability of the wireless channel; and
   transmit the reservation signal based at least in part on a determination of availability of the wireless channel.

7. The apparatus of claim 6, wherein the instructions are further executable by the one or more processors to cause the apparatus to:
   transmit a request-to-send transmission before transmitting the reservation signal and during a coordinated reservation period included in a time interval associated with the wireless channel; and
   transmit a clear-to-send transmission after transmitting the reservation signal and during the coordinated reservation period.

8. The apparatus of claim 6, wherein the instructions are further executable by the one or more processors to cause the apparatus to:
   receive the one or more access scheme parameters from another AP.

9. The apparatus of claim 6, wherein the one or more access scheme parameters further comprise a start time of a coordinated reservation period included in a time interval associated with the wireless channel, a duration of the coordinated reservation period, a duration of a plurality of service periods that includes the multiple service periods, one or more reservation policies, a reservation signal type, a clear signal enablement indication, or any combination thereof.

10. The apparatus of claim 1, wherein the instructions are further executable by the one or more processors to cause the apparatus to:
  transmit, to at least a subset of the one or more stations associated with the first AP, an indication to transmit a clear signal in response to receiving the reservation signal; and
  receive one or more clear signals in response to transmitting the reservation signal.

11. The apparatus of claim 10, wherein the clear signal comprises an indication of the multiple service periods reserved by the first AP for communicating with the one or more stations associated with the first AP.

12. The apparatus of claim 1, wherein the instructions are further executable by the one or more processors to cause the apparatus to:
  transmit control signaling allocating one or more resources for communications between the first AP and the one or more stations associated with the first AP, the control signaling selected based at least in part on the multiple service periods indicated in the reservation signal; and
  communicate with the one or more stations over the one or more resources.

13. The apparatus of claim 1, wherein the instructions are further executable by the one or more processors to cause the apparatus to:
  transmit the reservation signal during a coordinated reservation period included in a time interval associated with the wireless channel, wherein the time interval includes the plurality of service periods that include the multiple service periods.

14. An apparatus for wireless communications at a station, comprising:
  one or more processors;
  one or more memories coupled with the one or more processors; and
  instructions stored in the one or more memories and executable by the one or more processors to cause the apparatus to:
    receive, in accordance with an access order for access points (APs) to transmit reservation signals and in accordance with an access scheme for a first AP to reserve a wireless channel of a radio frequency spectrum band during at least a portion of time resources that are associated with the wireless channel and that are available to a plurality of APs including the first AP, a reservation signal over the wireless channel to reserve multiple service periods associated with the wireless channel,
    wherein each service period of the multiple service periods is configured for communications between a respective AP of the plurality of APs and respective one or more stations associated with the respective AP, between the respective AP and respective one or more APs of the plurality of APs, or any combination thereof, and
    wherein the reservation signal indicates the multiple service periods reserved by the first AP associated with the station; and
    communicate with the first AP during the multiple service periods reserved by the first AP based at least in part on the reservation signal.

15. The apparatus of claim 14, wherein the instructions are further executable by the one or more processors to cause the apparatus to:
  receive the reservation signal in accordance with the access order for each respective AP of the plurality of APs to transmit respective reservation signals, the access order comprised in one or more access scheme parameters received by the first AP.

16. The apparatus of claim 15, wherein the one or more access scheme parameters further comprise a start time of a coordinated reservation period included in a time interval associated with the wireless channel, a duration of the coordinated reservation period, a duration of a plurality of service periods that includes the multiple service periods, one or more reservation policies, a reservation signal type, a clear signal enablement indication, or any combination thereof.

17. The apparatus of claim 15, wherein the instructions are further executable by the one or more processors to cause the apparatus to:
  receive, during a coordinated reservation period included in a time interval associated with the wireless channel, an initial signal indicating another multiple service periods reserved by another AP, the multiple service periods reserved by the first AP being based at least in part on receiving the initial signal, wherein communications of the another AP during the another multiple service periods are prioritized over communications for remaining APs of the plurality of APs.

18. The apparatus of claim 14, wherein the instructions are further executable by the one or more processors to cause the apparatus to:
  receive one or more access scheme parameters associated with a service set and comprising an indication that the first AP is to perform a channel availability sensing operation, the service set being associated with the plurality of APs; and
  receive the reservation signal based at least in part on a determination of availability of the wireless channel obtained by the first AP.

19. The apparatus of claim 18, wherein the instructions are further executable by the one or more processors to cause the apparatus to:
  receive, from the first AP, a request-to-send transmission before receiving the reservation signal and during a coordinated reservation period included in a time interval associated with the wireless channel; and
  receive, from the first AP, a clear-to-send transmission after receiving the reservation signal and during the coordinated reservation period.

20. The apparatus of claim 18, wherein the one or more access scheme parameters further comprise a start time of a coordinated reservation period included in a time interval associated with the wireless channel, a duration of the coordinated reservation period, a duration of a plurality of service periods that includes the multiple service periods, one or more reservation policies, a reservation signal type, a clear signal enablement indication, or any combination thereof.

21. The apparatus of claim 14, wherein the instructions are further executable by the one or more processors to cause the apparatus to:
  receive, from the first AP, an indication to transmit a clear signal in response to receiving the reservation signal; and
  transmit the clear signal in response to transmitting the reservation signal.

22. The apparatus of claim 21, wherein the clear signal comprises an indication of the multiple service periods reserved by the first AP for communicating with one or more stations associated with the first AP.

23. The apparatus of claim 14, wherein the instructions are further executable by the one or more processors to cause the apparatus to:
receive control signaling allocating one or more resources for communications between the first AP and the station, the one or more resources selected based at least in part on the multiple service periods indicated in the reservation signal; and
communicate with the first AP over the one or more resources.

24. The apparatus of claim 14, wherein the instructions are further executable by the one or more processors to cause the apparatus to:
receive the reservation signal during a coordinated reservation period included in a time interval associated with the wireless channel, wherein the time interval includes the plurality of service periods that include the multiple service periods.

25. A method for wireless communications at a first access point (AP), comprising:
transmitting, in accordance with an access order for APs to transmit reservation signals and in accordance with an access scheme for the first AP to reserve a wireless channel of a radio frequency spectrum band during at least a portion of time resources that are associated with the wireless channel and that are available to a plurality of APs including the first AP, a reservation signal over the wireless channel to reserve multiple service periods associated with the wireless channel,
wherein each service period of the multiple service periods configured for communications between a respective AP of the plurality of APs and respective one or more stations associated with the respective AP, between the respective AP and respective one or more APs of the plurality of APs, or any combination thereof, and
wherein the reservation signal indicates the multiple service periods reserved by the first AP; and
communicating with at least one or more stations associated with the first AP during the multiple service periods reserved by the first AP based at least in part on the reservation signal.

26. The method of claim 25, further comprising:
receiving one or more access scheme parameters associated with the access scheme, the one or more access scheme parameters comprising the access order for each respective AP of the plurality of APs to transmit respective reservation signals; and
transmitting the reservation signal in accordance with the access order for the access scheme.

27. The method of claim 25, further comprising:
receiving one or more access scheme parameters associated with a service set and comprising an indication to perform a channel availability sensing operation, the service set being associated with the plurality of APs;
performing the channel availability sensing operation to determine availability of the wireless channel; and
transmitting the reservation signal based at least in part on a determination of availability of the wireless channel.

28. The method of claim 25, further comprising:
transmitting control signaling allocating one or more resources for communications between the first AP and the one or more stations associated with the first AP, the control signaling selected based at least in part on the multiple service periods indicated in the reservation signal; and
communicating with the one or more stations over the one or more resources.

29. The method of claim 25, further comprising:
transmitting the reservation signal during a coordinated reservation period included in a time interval associated with the wireless channel, wherein the time interval includes the plurality of service periods that include the multiple service periods.

30. A method for wireless communications at a station, comprising:
receiving, in accordance with an access order for access points (APs) to transmit reservation signals and in accordance with an access scheme for a first AP to reserve a wireless channel of a radio frequency spectrum band during at least a portion of time resources that are associated with the wireless channel and that are available to a plurality of APs including the first AP, a reservation signal over the wireless channel to reserve multiple service periods associated with the wireless channel,
wherein each service period of the multiple service periods is configured for communications between a respective AP of the plurality of APs and respective one or more stations associated with the respective AP, between the respective AP and respective one or more APs of the plurality of APs, or any combination thereof, and
wherein the reservation signal indicates the multiple service periods reserved by the first AP associated with the station; and
communicating with the first AP during the multiple service periods reserved by the first AP based at least in part on the reservation signal.

31. The method of claim 30, further comprising:
receiving the reservation signal in accordance with the access order for each respective AP of the plurality of APs to transmit respective reservation signals, the access order comprised in one or more access scheme parameters received by the first AP.

32. The method of claim 30, further comprising:
receiving one or more access scheme parameters associated with a service set and comprising an indication that the first AP is to perform a channel availability sensing operation, the service set being associated with the plurality of APs; and
receiving the reservation signal based at least in part on a determination of availability of the wireless channel obtained by the first AP.

33. The method of claim 32, wherein the one or more access scheme parameters further comprise a start time of a coordinated reservation period included in a time interval associated with the wireless channel, a duration of the coordinated reservation period, a duration of a plurality of service periods that includes the multiple service periods, one or more reservation policies, a reservation signal type, a clear signal enablement indication, or any combination thereof.

34. The method of claim 30, further comprising:
receiving the reservation signal during a coordinated reservation period included in a time interval associated with the wireless channel, wherein the time interval includes the plurality of service periods that include the multiple service periods.

* * * * *